US007909289B2

(12) United States Patent
Perez-Sanchez

(10) Patent No.: US 7,909,289 B2
(45) Date of Patent: Mar. 22, 2011

(54) CLOSURE SYSTEM FOR A SUPPORT STRUCTURE

(75) Inventor: Juan Perez-Sanchez, Feldkirchen-Westerham (DE)

(73) Assignee: EADS Deutschland GmbH, Ottobrunn (DE)

( * ) Notice: Subject to any disclaimer, the term of this patent is extended or adjusted under 35 U.S.C. 154(b) by 111 days.

(21) Appl. No.: 12/340,141

(22) Filed: Dec. 19, 2008

(65) Prior Publication Data

US 2009/0173824 A1 Jul. 9, 2009

Related U.S. Application Data

(63) Continuation of application No. 10/943,251, filed on Sep. 17, 2004, now Pat. No. 7,503,523.

(30) Foreign Application Priority Data

Sep. 20, 2003 (DE) .................................. 103 43 627

(51) Int. Cl.
*B64C 1/14* (2006.01)

(52) U.S. Cl. ............. 244/129.4; 292/256.65; 292/256.5; 220/810; 49/398

(58) Field of Classification Search ............... 244/129.4, 244/129.3, 129.5, 131, 159.4, 158.1; 114/116, 114/201 R; 49/324, 398, 381; 70/91, 77; 220/810, 288; 292/256.5, 256.6, 256.65
See application file for complete search history.

(56) References Cited

U.S. PATENT DOCUMENTS

| 1,814,933 A | 7/1931 | Keen |
| 2,008,741 A | 7/1935 | Allan |
| 2,088,909 A | 8/1937 | Jaubert |
| 2,130,297 A | 9/1938 | Edwards |
| 2,301,963 A | 11/1942 | Eck et al. |
| 2,354,789 A | 8/1944 | Atwood |
| 2,469,131 A | 5/1949 | Ross |
| 2,473,616 A | 6/1949 | Stephenson |
| 2,530,160 A | 11/1950 | Finley |
| 2,549,110 A | 4/1951 | Michael |
| 2,869,485 A | 1/1959 | Deaton et al. |
| 2,943,756 A | 7/1960 | White |
| 3,009,672 A | 11/1961 | Tharratt |

(Continued)

FOREIGN PATENT DOCUMENTS

DE  92 07 122  9/1992

(Continued)

OTHER PUBLICATIONS www.auto.howstuffworks.com/seatnelt.htm, "How Seatbelts Work", pp. 1-6.

*Primary Examiner* — Benjamin P Lee
(74) *Attorney, Agent, or Firm* — Greenblum & Bernstein, P.L.C

(57) ABSTRACT

System for opening and closing a structural part arranged on a support structure. The system includes at least one hinged joint device for flexibly connecting the structural part to the support structure. The at least one hinged joint device is arranged inside the support structure and has an axis of rotation about which the structural part can be pivoted relative to the support structure during opening and closing. A locking arrangement is structured and arranged to connect the structural part to the support structure in a form-locking manner when the structural part is in a closed position. In the closed position, the locking arrangement is arranged to relieve the at least one hinged joint device. This Abstract is not intended to define the invention disclosed in the specification, nor intended to limit the scope of the invention in any way.

7 Claims, 28 Drawing Sheets

U.S. PATENT DOCUMENTS

| | | | |
|---|---|---|---|
| 3,129,040 A | 4/1964 | De Rose |
| 3,150,849 A | 9/1964 | Conway et al. |
| 3,171,620 A | 3/1965 | Walley et al. |
| 3,302,333 A | 2/1967 | Decubber et al. |
| 3,374,972 A | 3/1968 | Webb, Sr. |
| 3,653,615 A | 4/1972 | Spence |
| 3,987,876 A | 10/1976 | Foults |
| 4,011,819 A | 3/1977 | Kessler |
| 4,030,850 A | 6/1977 | Hyde |
| 4,106,661 A | 8/1978 | Hunt |
| 4,312,153 A | 1/1982 | Parkinson et al. |
| 4,324,373 A | 4/1982 | Zibritosky |
| 4,441,278 A | 4/1984 | Covey, III |
| 4,497,462 A | 2/1985 | Hamatani |
| 4,510,714 A | 4/1985 | Kasper et al. |
| 4,581,615 A | 4/1986 | Levy |
| 4,627,355 A | 12/1986 | Gause et al. |
| 4,679,750 A | 7/1987 | Burhans |
| 4,706,413 A | 11/1987 | James |
| 4,720,065 A | 1/1988 | Hamatani |
| 4,722,151 A | 2/1988 | Westwell |
| H451 H | 4/1988 | Pinnell |
| 4,739,955 A | 4/1988 | Aquino et al. |
| 4,749,997 A | 6/1988 | Canonico |
| 4,790,571 A | 12/1988 | Montanari et al. |
| 4,991,347 A | 2/1991 | Takimoto et al. |
| 5,031,863 A | 7/1991 | Noble |
| 5,102,070 A | 4/1992 | Smialowicz et al. |
| 5,176,493 A | 1/1993 | Toro-Lira et al. |
| 5,197,695 A | 3/1993 | Andersson et al. |
| 5,346,272 A | 9/1994 | Priest et al. |
| 5,350,136 A | 9/1994 | Prosser et al. |
| 5,352,061 A | 10/1994 | Robinson |
| 5,411,349 A | 5/1995 | Hornung et al. |
| 5,520,476 A | 5/1996 | Marks et al. |
| 5,649,680 A | 7/1997 | Andersson |
| 5,691,736 A | 11/1997 | Hunn et al. |
| 5,743,492 A | 4/1998 | Chan et al. |
| 5,803,406 A | 9/1998 | Kolodziej et al. |
| 5,820,077 A | 10/1998 | Sutliff et al. |
| 5,861,305 A | 1/1999 | Silley et al. |
| 5,896,112 A | 4/1999 | Bickford et al. |
| 5,924,649 A | 7/1999 | Piening et al. |
| 5,931,415 A | 8/1999 | Lingard et al. |
| 5,975,463 A | 11/1999 | Gruensfelder et al. |
| 5,988,566 A | 11/1999 | Meyer |
| 6,029,928 A | 2/2000 | Kelly |
| 6,059,234 A | 5/2000 | Mueller et al. |
| 6,076,467 A | 6/2000 | Cespedosa et al. |
| 6,193,436 B1 | 2/2001 | Ellis |
| 6,196,617 B1 | 3/2001 | Beck |
| 6,213,426 B1 | 4/2001 | Weber et al. |
| 6,213,428 B1 | 4/2001 | Chaumel et al. |
| 6,290,182 B1 | 9/2001 | Grunditz |
| 6,394,392 B1 | 5/2002 | Lafferty |
| 6,443,392 B2 | 9/2002 | Weber et al. |
| 6,494,407 B2 | 12/2002 | Arulf |
| 6,499,773 B1 | 12/2002 | Ostergaard |
| 6,622,967 B2 | 9/2003 | Weelden et al. |
| 6,648,543 B2 | 11/2003 | Arulf |
| 6,702,300 B1 | 3/2004 | Steinetz et al. |
| 6,834,834 B2 | 12/2004 | Dazet et al. |
| 6,951,319 B2 | 10/2005 | Colich |
| D512,365 S | 12/2005 | Bladt et al. |
| 6,981,816 B2 | 1/2006 | Huessler |
| 2001/0025903 A1 | 10/2001 | Weber et al. |
| 2002/0005460 A1 | 1/2002 | Dazet et al. |
| 2003/0141415 A1 | 7/2003 | Leclerc |
| 2004/0045959 A1 | 3/2004 | Loble et al. |
| 2005/0116106 A1 | 6/2005 | Perez-Sanchez |
| 2005/0247823 A1 | 11/2005 | Wood et al. |
| 2006/0022088 A1 | 2/2006 | Dazet et al. |
| 2007/0045472 A1 | 3/2007 | Erben et al. |

FOREIGN PATENT DOCUMENTS

| | | |
|---|---|---|
| DE | 296 15 287 | 2/1997 |
| FR | 2 758 521 | 7/1998 |

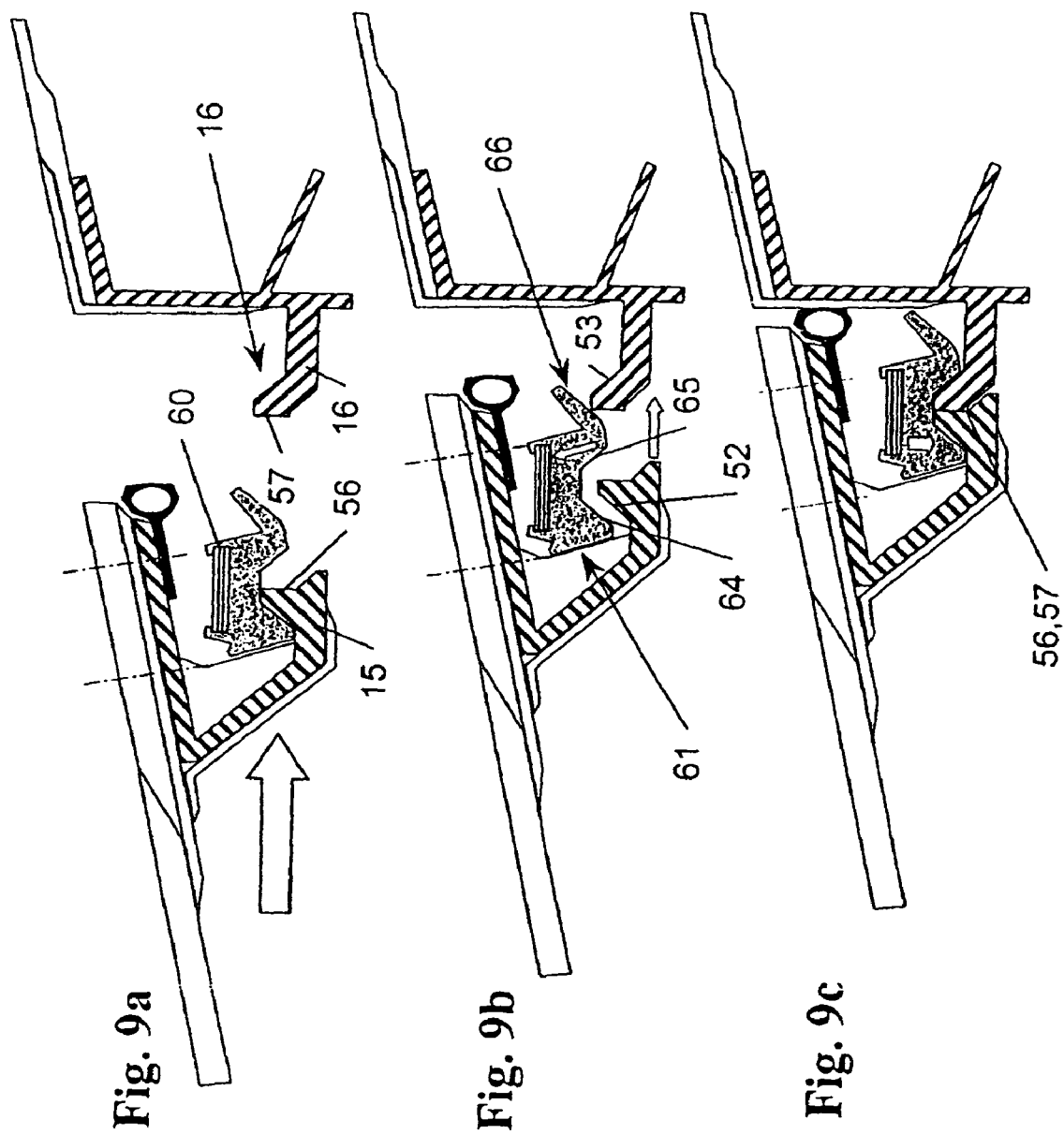

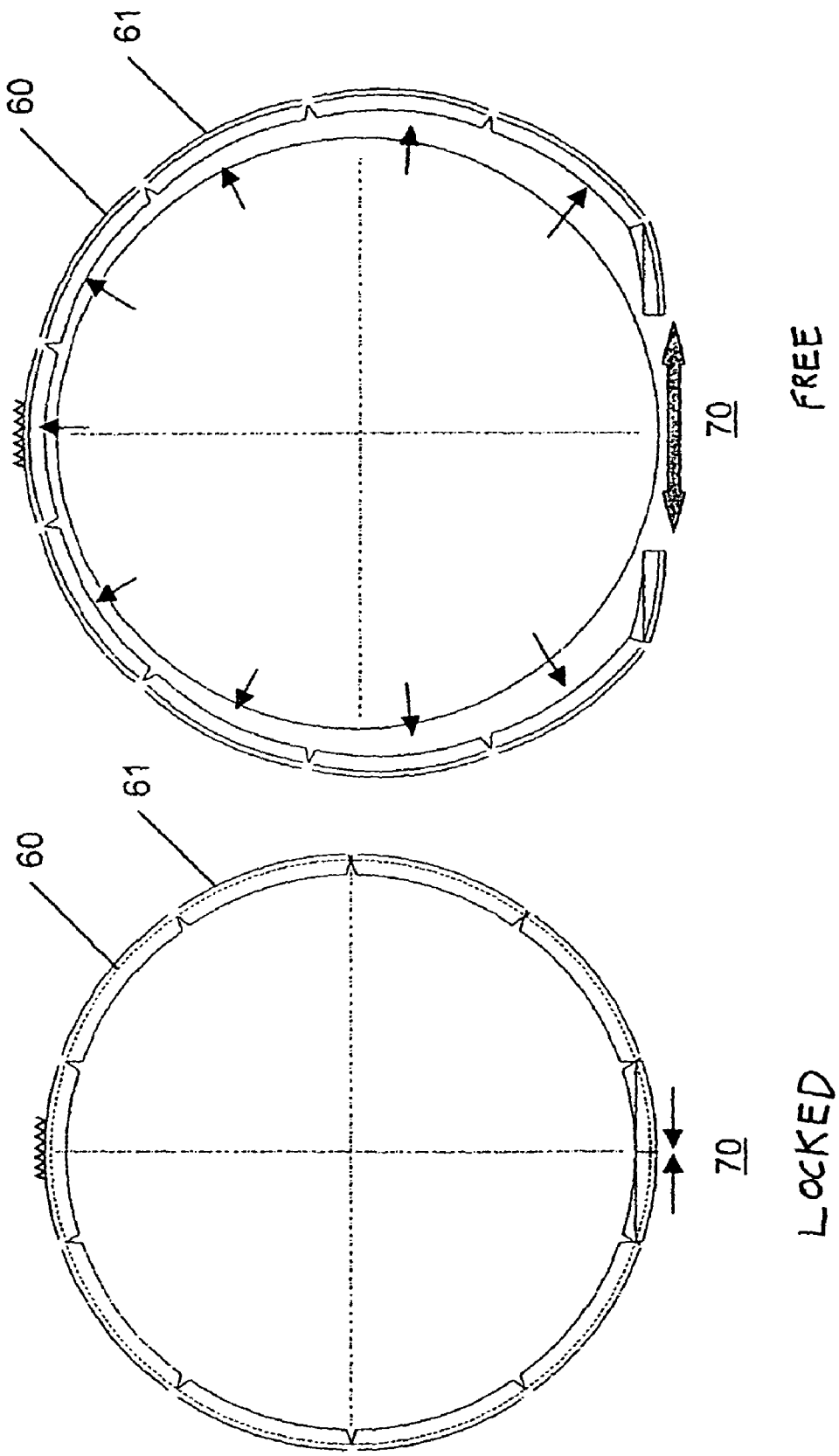

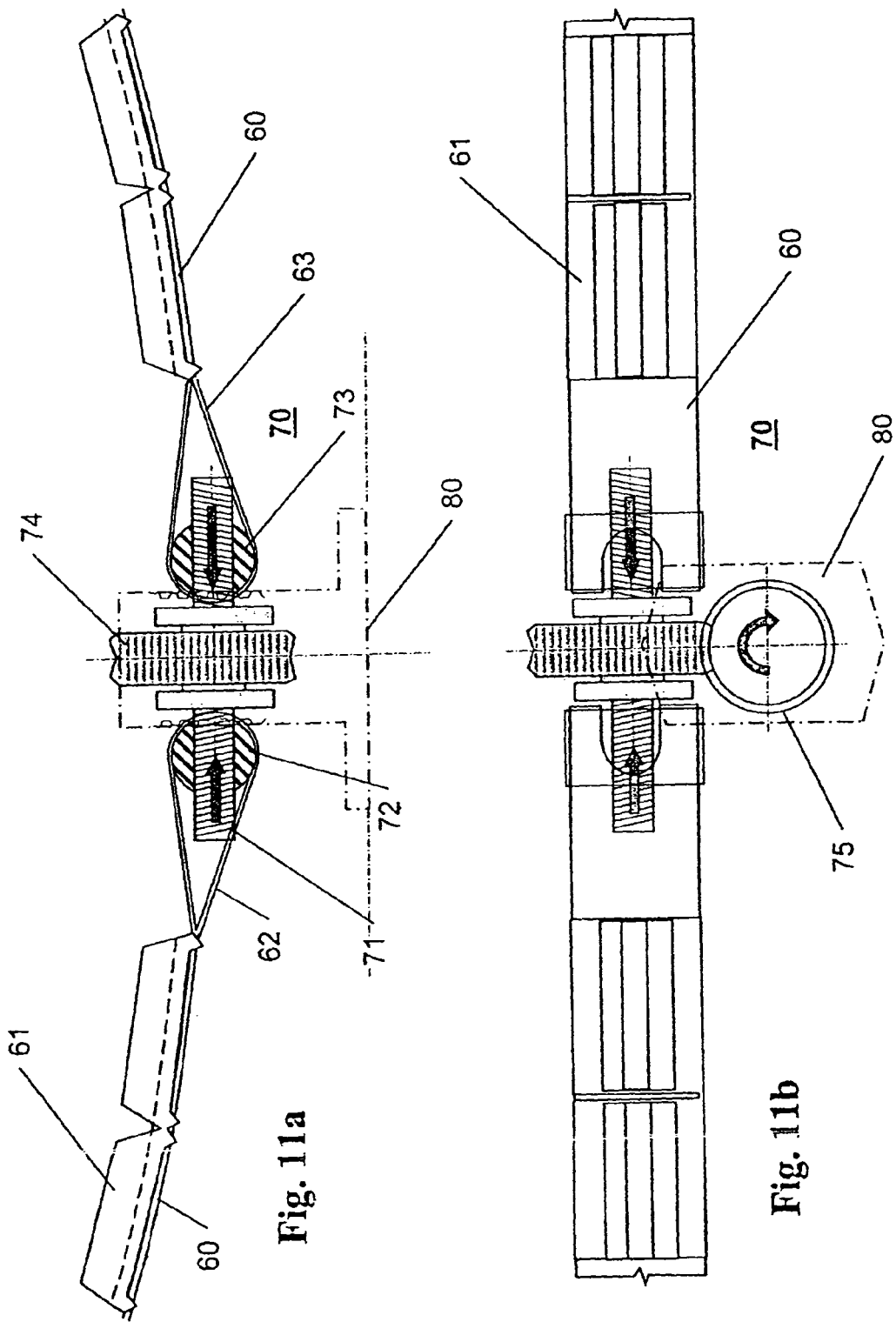

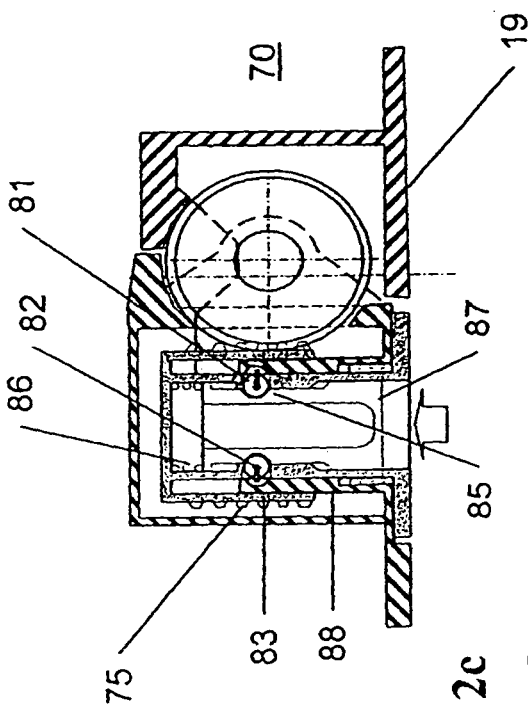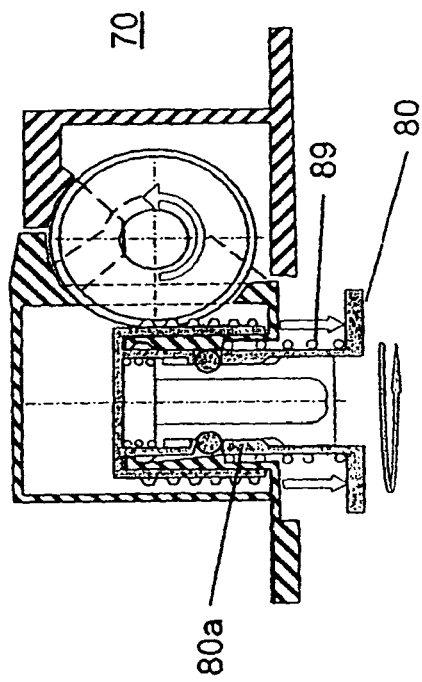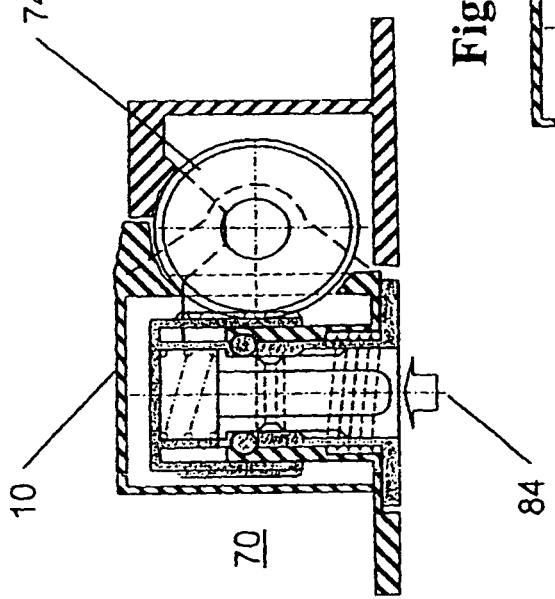

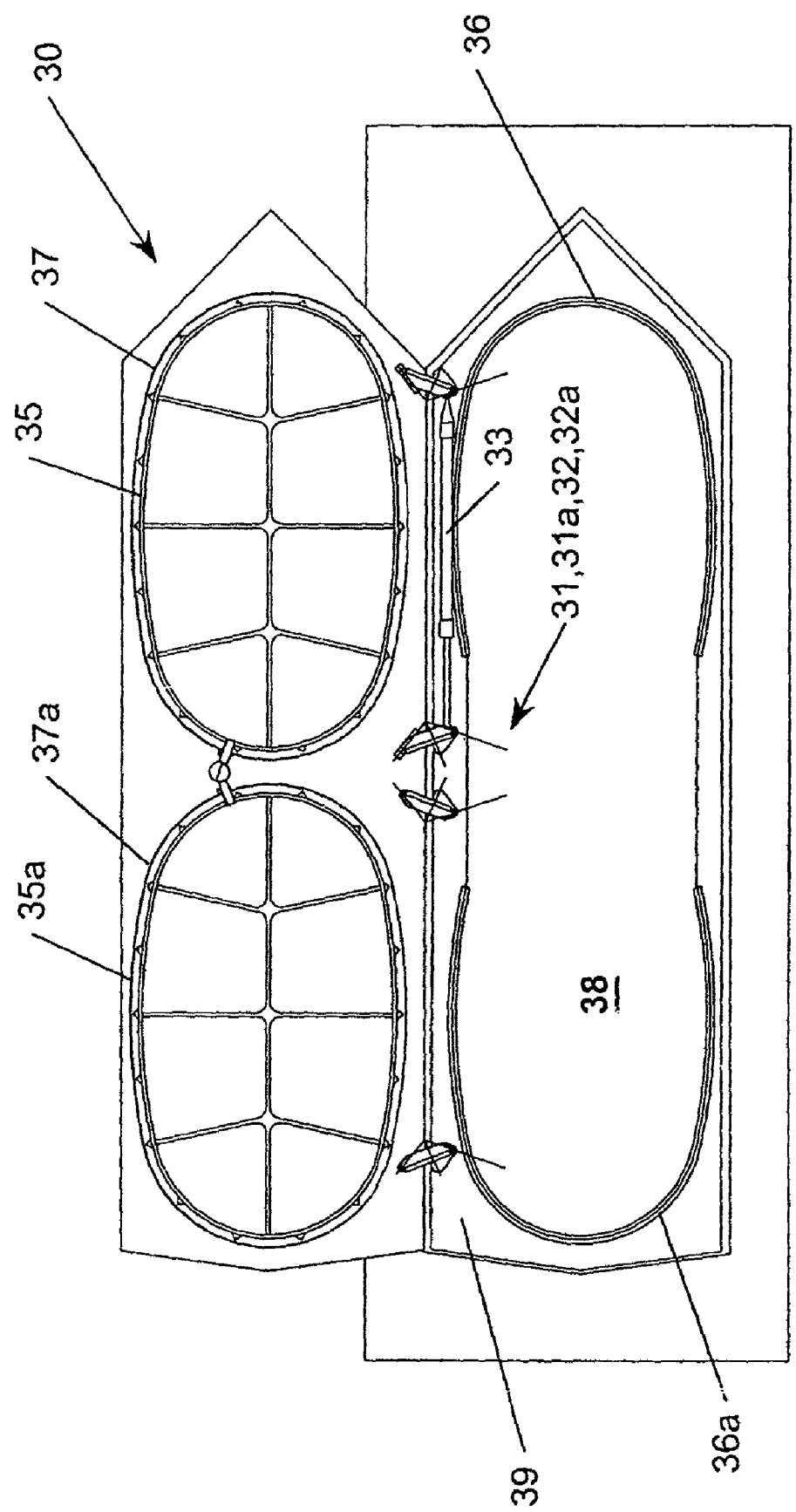

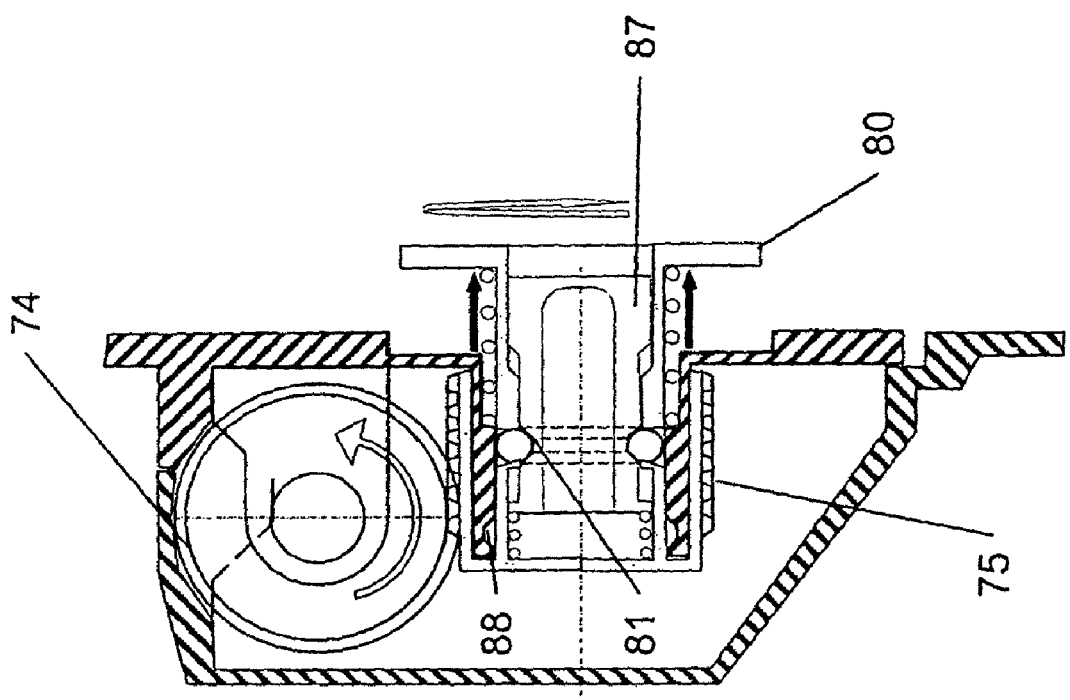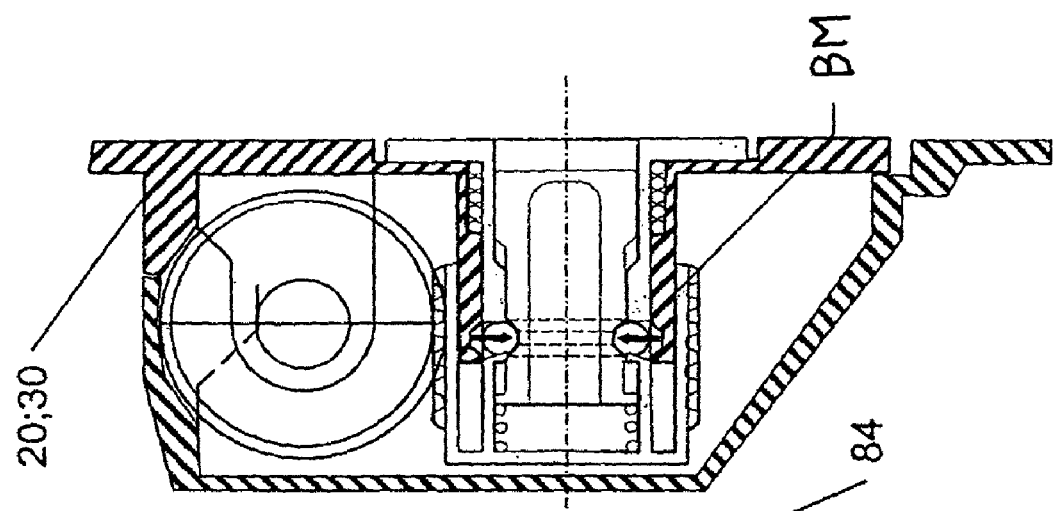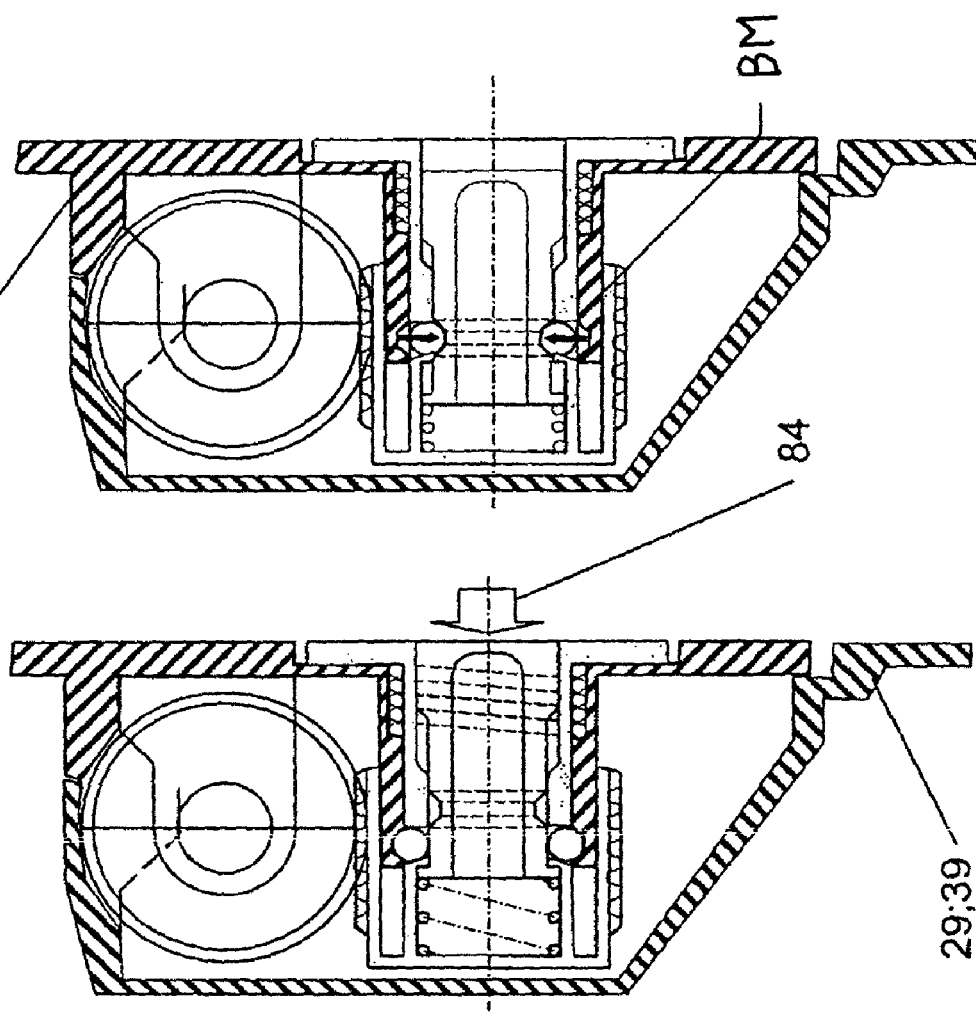

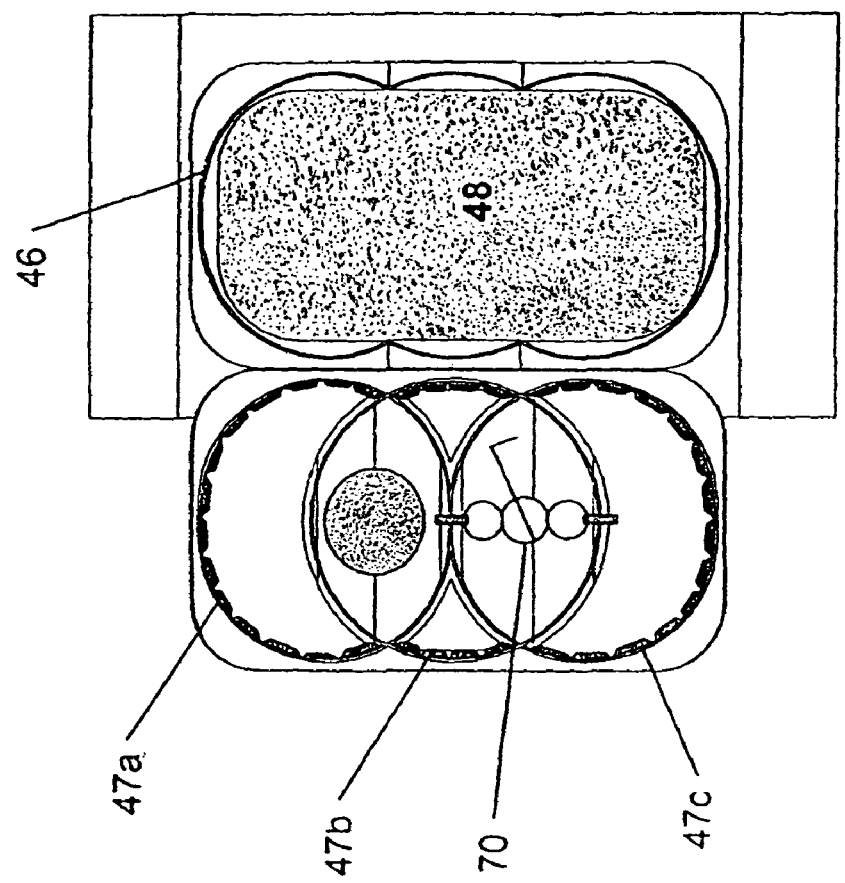
Fig. 22c
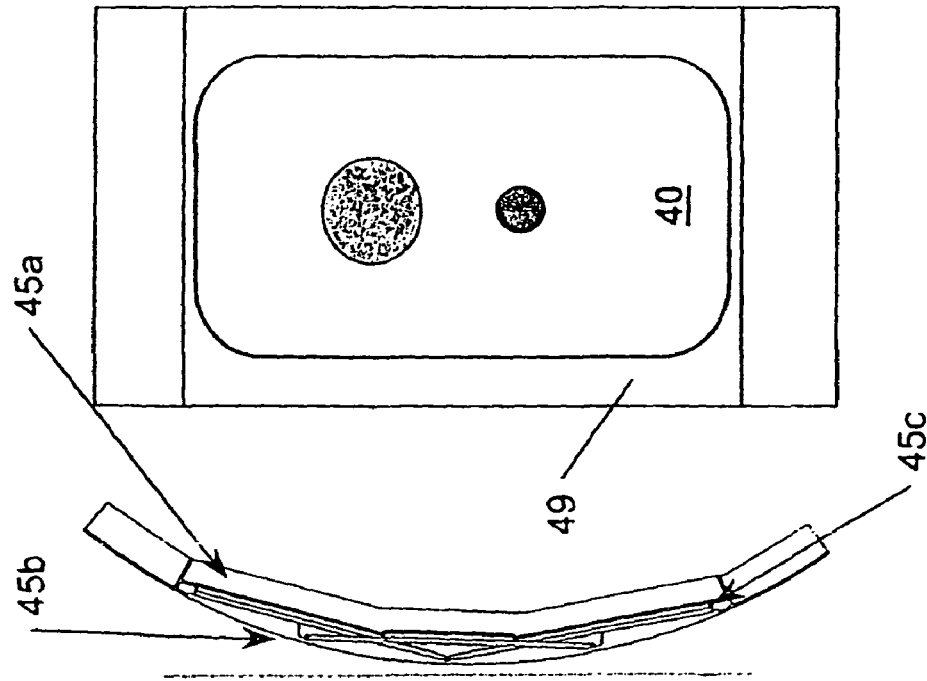
Fig. 22b
Fig. 22a

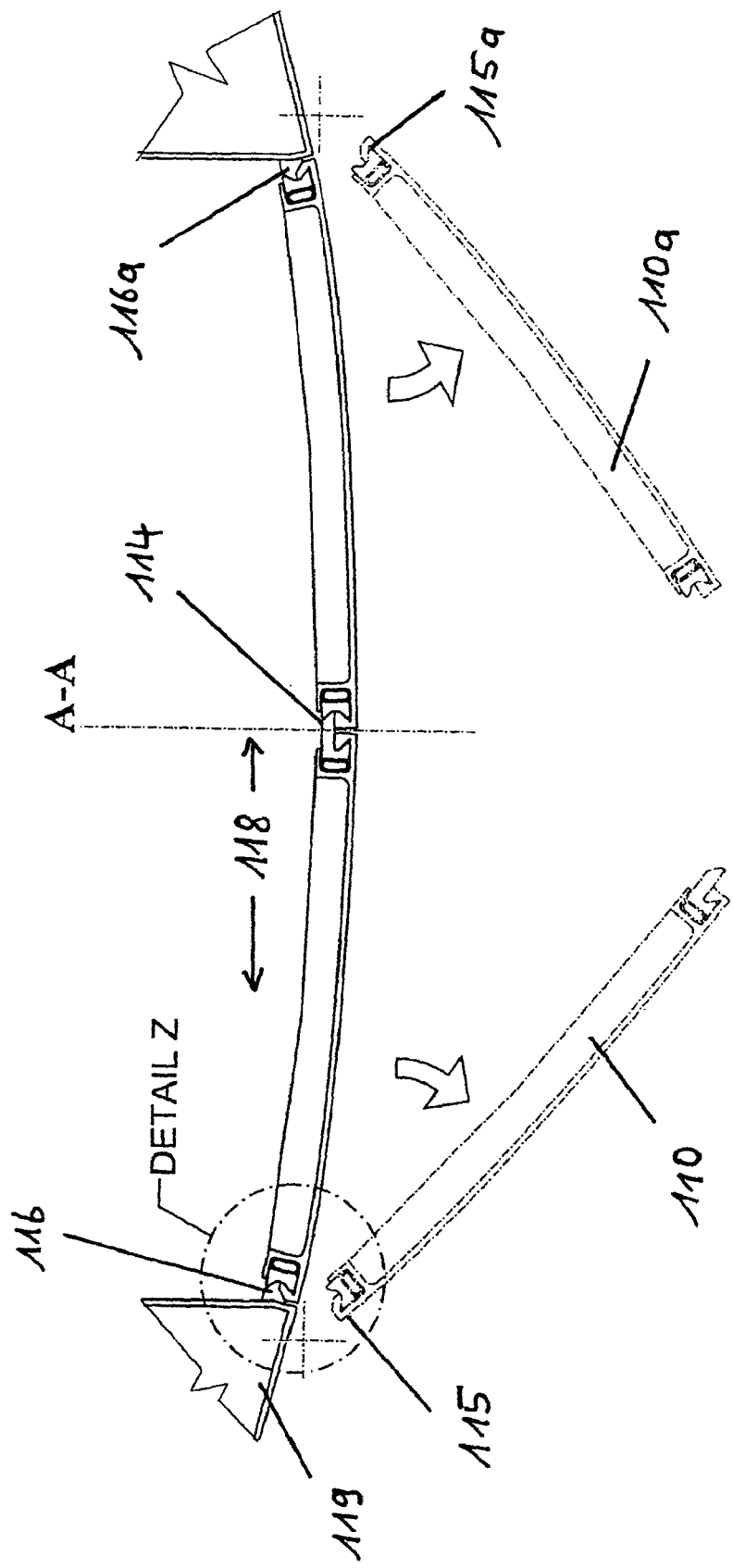

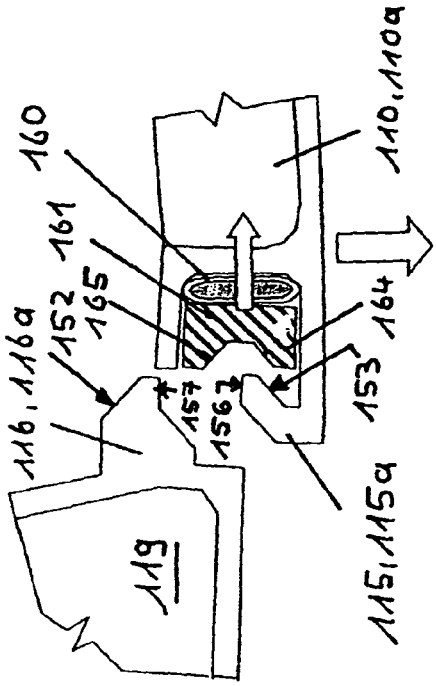
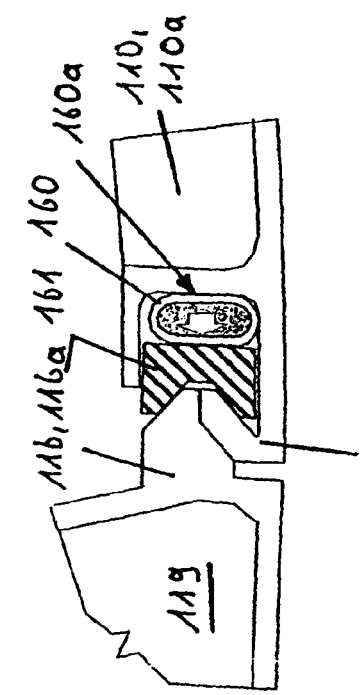
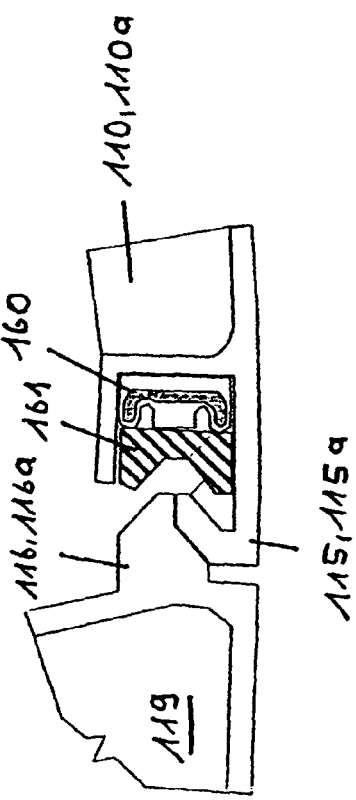

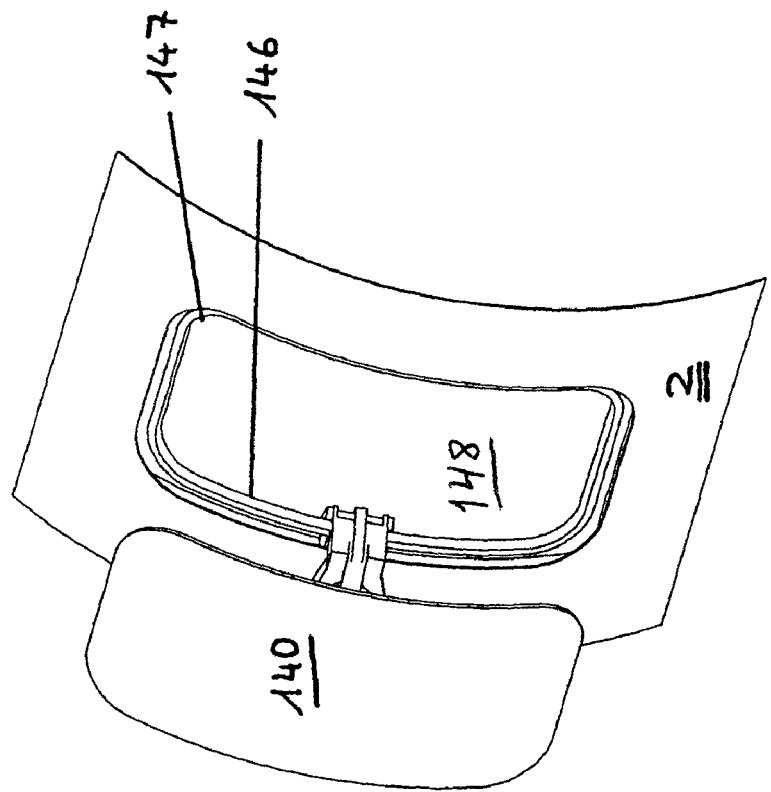
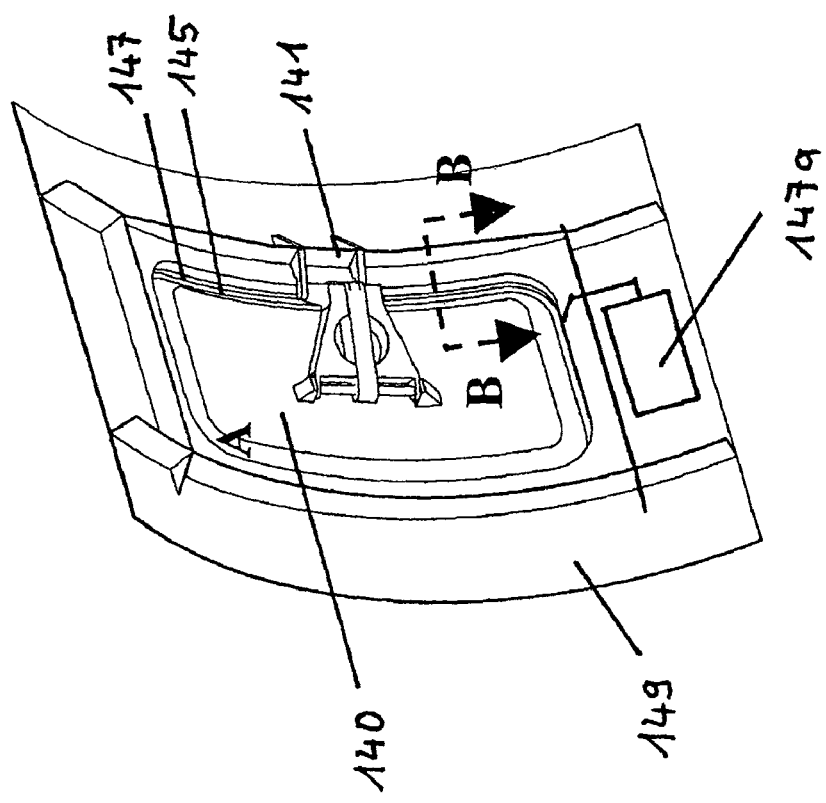
Fig. 27a
Fig. 27b

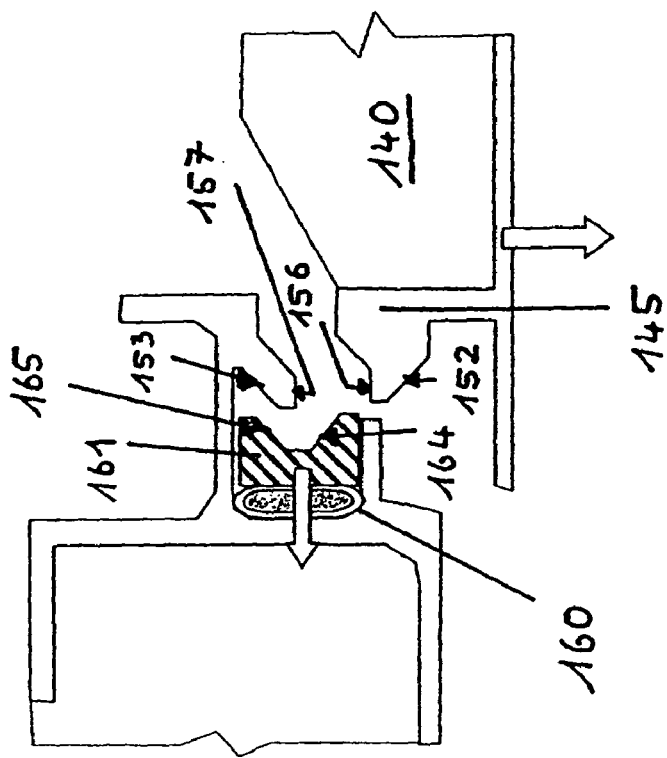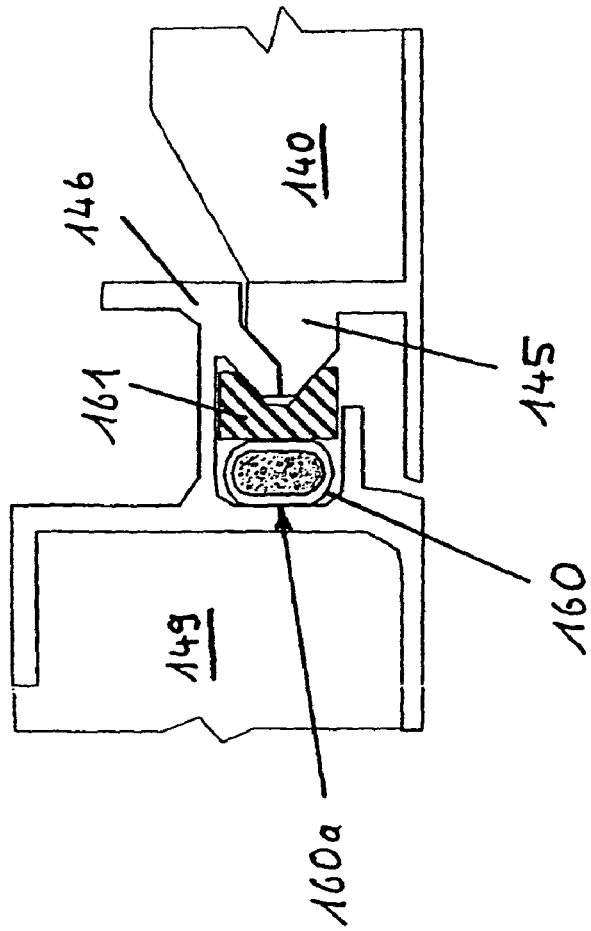
Fig. 28a
Fig. 28b

CLOSURE SYSTEM FOR A SUPPORT STRUCTURE

CROSS-REFERENCE TO RELATED APPLICATIONS

The present application is a continuation application of parent U.S. patent application Ser. No. 10/943,251 filed on Sep. 17, 2004, now U.S. Pat. No. 7,503,523 the disclosure of which is expressly incorporated by reference herein in its entirety. The present application also claims priority under 35 U.S.C. §119 of German Patent Application No. 103 43 627.8, filed on Sep. 20, 2003, the disclosure of which is expressly incorporated by reference herein in its entirety.

BACKGROUND OF THE INVENTION

1. Field of the Invention

The invention relates to a closure device for a support structure that is, e.g., an area of the outer contour of an aircraft that can be opened and closed for the purpose of access.

2. Discussion of Background Information

In aircraft, such closure devices are provided, in particular, as hatches for maintenance and inspection purposes, as a radome, as a passenger or cargo compartment door, or for a similar purpose. If such a closure device is provided for maintenance or inspection purposes, it is often necessary for it to be possible for these parts of the outer contour to be opened and closed more or less quickly, which is the case anyway with a passenger or cargo compartment door. It is thereby essential, in particular, if the aircraft is a high-speed aircraft, that the aerodynamic outer contour is only slightly impaired thereby and that the mechanical connection to the rest of the structure of the aircraft reliably withstands the operating loads occurring.

Very different solutions have hitherto been realized for such closure devices, whereby most of the mechanisms comprise hinge elements and locking elements of different types. Depending on the required opening angle of the closure device, and the necessity of integrating it into the structure of the aircraft as a supporting element, very solid hinges sometimes result. The closure devices are often embodied by locking elements in the form of hooks or shear pins.

If the aircraft is a combat aircraft, expensive measures are often taken to damp the radar reflection values in the area of the closure devices, i.e., at the hinge, the lock and at gaps or steps at the transition between the closure device and the rest of the outer skin of the aircraft. Moreover, these locations are more or less responsible for aerodynamic resistance and thus for the fuel consumption of the aircraft.

SUMMARY OF THE INVENTION

The invention aims to provide an improved closure device of the type mentioned.

This aim is attained by providing a closure device having one or more of the features described below. Advantageous further developments of the closure device according to the invention are also described herein.

According to the invention, a closure device is created for an area of the outer contour of an aircraft which can be opened and closed for the purpose of obtaining access. The closure device has a hinge through which the closure device is connected to the structure of the aircraft and about which the closure device can be pivoted between an opened position and a closed position. It also has a locking device with which the closure device can be locked against the structure of the aircraft in the closed position. According to the invention, the hinge is arranged inside the outer contour of the aircraft and has a virtual axis of rotation located outside the outer contour of the aircraft. It is about this axis that the closure device is pivoted during opening and closing. The locking device is embodied such that in the closed state it connects the closure device to the structure of the aircraft in a form-locking manner. In this way, the locking device essentially completely relieves the hinge.

One advantage of the closure device according to the invention is that it guarantees improved aerodynamic properties of the aircraft. This is because it manages to do so without a hinge lying on the outside. Another advantage is that the static properties of the connection are improved. Furthermore, gaps and steps are reduced or avoided in the aircraft structure, which is conducive to a reduction of the aerodynamic resistance and, if desired, of the radar echo. A further important advantage is that, in the closed state of the closure device, the hinges do not bear the operating loads and can thus be built in a relatively light manner. A further advantage is the small space requirement for the invention and the great compactness of the closure device. Another very important advantage is that there is a very low risk of blocking the closure device, so that it is fail-safe and works effectively.

According to the invention, a closure device for opening and closing a structural part arranged on a support structure, with at least one hinged joint device for the flexible connection of the body part to the structural part and with a locking device with which the closure device can be locked in the closed position, is provided. The at least one hinged joint device is arranged inside the vehicle structure and has an axis of rotation of the structural part about which the same can be pivoted during opening and closing. The axis of rotation is located on the side to which the structural part can be pivoted for opening. The locking device is embodied such that in the closed state it connects the structural part to the support structure in a form-locking manner while relieving the hinged joint device.

The locking device can comprise at least one first flange that can be arranged on the structural part and at least one second flange that can be arranged on the support structure and that interacts with the first flange. A blocking device interacts with first and second flanges such that in the closed position it provides a form-closed locking between the first flange and the second flange. The locking device also has a tightening mechanism with which the blocking device can be tightened or released on or relative to the flanges.

The hinged joint device can include two legs flexibly coupled to one another, wherein the first leg is attached to the structural part and the second leg is attached to the support structure. The joint axis that connects the two legs to one another can run in the direction of the axis of rotation of the closure device. Alternatively, the hinged joint device can include two legs which are flexibly coupled to one another with a first axis, a second axis and a center axis, wherein these axes intersect at a point located on the axis of rotation of the closure device.

The first flange and the second flange can respectively form a curve running in a completely closed manner. The first flange and/or the second flange can also act to limit the outer circumference of a passage opening that can be closed by the closure device. Furthermore, the first and second flange can be circular, oval or composed of several parts of circular and/or oval flanges.

The first and second flange can respectively lie in one plane. The parts of circular and/or oval flanges of which the first and second flange are respectively composed can lie in different planes that intersect where the parts of the flange touch one another.

The blocking device can be formed by a chain or belt arrangement for locking the first and second flange. In the closed state of the closure device, the chain or belt arrangement can be arranged to run radially outside and around the circumference of the first and second flange. On sides facing one another, the first and second flange respectively feature stop surfaces that rest against one another when the closure device is closed. The flanges also feature first locking surfaces on sides facing away from one another. The chain or belt arrangement includes a number of clamp elements that feature respective second locking surfaces interacting in a form-locking manner with the first locking surfaces provided on the first and second flanges. The chain or belt arrangement has a tightening mechanism with which the chain or belt arrangement is adjustable in its length for releasing or tightening the same between an extended and/or expanded state in which the first locking surfaces of the first and second flanges and the second locking surfaces of the clamp elements are free of one another so as to release the closure device, and a contracted and/or retracted state in which the first locking surfaces of the first and second flanges and the second locking surfaces of the clamp elements are fixed against one another to lock the closure device.

Alternatively, the blocking or locking device can be composed of a chain arrangement which enables the locking of the first and second flange, wherein in the closed state of the closure device, the arrangement is arranged to run around the circumference of the first and second flange. The first and second flanges respectively feature stop surfaces on sides facing one another that rest against one another when the closure device is closed and first locking surfaces on sides facing away from one another. The flexible chain arrangement includes a number of clamp elements which feature respective second locking surfaces interacting in a form-locking manner with the first locking surfaces provided on the first and second flanges. The chain arrangement features a tightening mechanism with which the chain arrangement is adjustable in its radial length between a first position in which the first locking surfaces of the first and second flanges and the second locking surfaces of the clamp elements are free of one another to release the closure device, and a second position in which the first locking surfaces of the first and second flanges and the second locking surfaces of the clamp elements are fixed against one another to lock the closure device.

The chain arrangement can be arranged to run radially outside around the circumference of the first and second flanges, whereby in the first position, the closure device is released and the clamp elements of the chain arrangement adopt a position lying radially further outwards, and whereby in the second position, the closure device is locked and the clamp elements adopt a position lying radially further inwards. Alternatively, the chain arrangement can be arranged to run radially inside the first and second flanges, whereby, in the first position, the closure device is released and the clamp elements of the chain arrangement adopt a position lying radially further inwards and in the second position the closure device is locked and the clamp elements adopt a position lying radially further outwards.

The first locking surfaces can form an outer conical cross-sectional shape which tapers outwards, and the second locking surfaces can form an inner conical cross-sectional shape which taper outwards and which matches the former during locking.

The chain or belt arrangement can be arranged in a fixed manner with respect to one of the first or second flanges and on the side facing the other flange. The clamp elements can feature a sliding block surface tilted outwards by way of which the clamp elements can be displaced radially outwards during closing of the closure device. This can occur through the other flange in order to engage the first locking surface of the other flange behind the assigned second locking surface of the clamp elements.

The tightening mechanism can include a thread tightener which acts between respective opposite ends of the chain or belt arrangement and a helical gear for operating the same. The helical gear contains a gear wheel coupled to the thread tightener and a worm wheel coupled to a drive element. The drive element can thereby be a hand twist grip. The hand twist grip can be coupled to the worm wheel via a ball lock that can be unlocked by way of a separate operating element. This can occur, in particular, by way of a push button. Furthermore, the hand twist grip can be displaceable in the direction of its axis of rotation between a lowered position, in which it is secured against rotation, and a raised or not lowered position in which it is released for rotation. A spring can be provided through which the hand twist grip is displaced during unlocking by the ball lock from the lowered position into the raised or not lowered position.

The tightening mechanism can also contain a pressure hose arranged between the clamp elements and a contact surface lying radially displaced thereto. The hose can be acted on by a hydraulic or pneumatic drive medium. A pressure medium pump is connected to the pressure hose for feeding the drive medium to the pressure hose. In this way, acting on the pressure hose with the drive medium creates a cross-sectional enlargement of the pressure hose and causes a radial displacement of the clamp elements from the first position to the second position in order to lock the closure device. Draining the drive medium from the pressure hose produces a cross-sectional reduction of the same and causes a radial displacement of the clamp elements from the second position to the first position in order to release and/or unlock the closure device. The clamp elements can be spring-preloaded to provide radial displacement from the second position to the first position, so that on releasing pressure of the drive medium from the pressure hose, a displacement of the clamp elements takes place automatically through the spring action from the second position to the first position to release the closure device. Alternatively, the clamp elements can be radially displaceable by draining the drive medium from the pressure hose, thereby producing a cross-sectional reduction of the same, to release the closure device from the second position to the first position.

The chain or belt arrangement can be arranged on the structure of the aircraft. The chain or belt arrangement can also be arranged on the closure device.

The closure device according to the invention can be a radome, a maintenance or inspection hatch, or a landing-gear door. The closure device can also be a two-leave door using a first leaf and a second leaf, whereby a center closure is used and is activated by the chain arrangement. Alternatively, other activation mechanisms can be provided between the leaves. The closure device can furthermore be a passenger door.

The invention also provides for a system for opening and closing a structural part arranged on a support structure, wherein the system comprises at least one hinged joint device for flexibly connecting the structural part to the support structure. The at least one hinged joint device is arranged inside the support structure and has an axis of rotation about which the structural part can be pivoted relative to the support structure during opening and closing. A locking arrangement is structured and arranged to connect the structural part to the support structure in a form-locking manner when the structural part is in a closed position. In the closed position, the locking arrangement is arranged to relieve the at least one hinged joint device.

In the closed position, the locking arrangement may be arranged to lock the structural part to the support structure such that the at least one hinged joint device is substantially free of forces normally acting on the at least one hinged joint device when the structural part is in a opened position. In the closed position, the locking arrangement may be arranged to lock the structural part to the support structure such that the at least one hinged joint device does not substantially participate in securing the structural part to the support structure.

The locking arrangement may comprise at least one first flange arranged on the structural part and at least one second flange interacting with the first flange and arranged on the support structure. The locking arrangement may further comprise a locking device which interacts with the first and second flanges, wherein, in the closed position, the locking device locks the first and second flanges to each other. The locking arrangement may comprise a tightening mechanism. The tightening mechanism may be structured and arranged to lock and unlock the locking device relative to the first and second flanges. The tightening mechanism may be structured and arranged to radially expand and contract the locking device relative to at least one of the first and second flanges.

The at least one hinged joint device may comprise first and second legs flexibly coupled to one another, the first leg being attached to the structural part and the second leg being attached to the support structure. A joint axis that connects the first and second legs to one another may run at least one of along a direction of the axis of rotation and parallel to the axis of rotation.

The at least one hinged joint device may comprise two legs flexibly coupled to one another. The at least one hinged joint device may comprise a first axis, a second axis, and a third axis, wherein the first, second and third axes intersect at a point located on the axis of rotation. The locking arrangement may comprise a first flange arranged on the structural part and a second flange arranged on the support structure. At least one of the first and second flanges may comprise a completely closed curved flange. At least one of the first and second flanges may comprise a continuously curved flange. At least one of the first and second flanges may define an outer circumference or perimeter of a passage opening. At least one of the first and second flanges may be generally circular. Each of the first and second flanges may be generally circular. At least one of the first and second flanges may be generally oval. Each of the first and second flanges may be generally oval. At least one of the first and second flanges may comprise at least one of a plurality of partially circular sections and a plurality of partially oval sections. At least in the closed position, the first and second flanges respectively lie on a common plane.

The locking arrangement may comprise a first flange arranged on the structural part and a second flange arranged on the support structure, whereby each of the first and second flanges comprise at least two curved sections which lie on different planes. The locking arrangement may comprise a first flange arranged on the structural part and a second flange arranged on the support structure, whereby each of the first and second flanges comprise at least two adjacent curved sections which are oriented on different planes that interest one another.

The locking arrangement may comprise a chain or belt arrangement structured and arranged to lock a first flange of the structural part to a second flange of the support structure. The chain or belt arrangement may be arranged radially outside and around a circumference of the first and second flanges. The first and second flanges may respectively comprise opposite facing stop surfaces which rest against one another in the closed position. The first and second flanges may respectively comprise first locking surfaces which face away from each other. The chain or belt arrangement may comprise a plurality of clamp elements. Each of the plurality of clamping elements may comprise second locking surfaces which interact in a form-locking manner with the first locking surfaces of the first and second flanges. Each of the plurality of clamping elements may comprise second locking surfaces which engage with the first locking surfaces of the first and second flanges. Each of the plurality of clamping elements may comprise second locking surfaces which sealingly engage with the first locking surfaces of the first and second flanges.

The chain or belt arrangement may comprise a tightening mechanism adapted to adjustable an overall length of the chain or belt arrangement. The tightening mechanism may be structured and arranged to release or tighten the chain or belt arrangement, whereby the chain or belt arrangement is movable between an expanded state in which the first locking surfaces and the second locking surfaces are not forced against each other so as to allow the first and second flanges to separate from one another, and a contracted state in which the first locking surfaces and the second locking surfaces are forced against one another to lock the structural part in the closed position. The tightening mechanism may be structured and arranged to release or tighten the chain or belt arrangement, whereby the chain or belt arrangement is movable between an expanded unlocked state in which the first locking surfaces and the second locking surfaces are not forced against each other and a contracted locked state in which the first locking surfaces and the second locking surfaces are forced against one another. The tightening mechanism may be structured and arranged to release and tighten the chain or belt arrangement, whereby the chain or belt arrangement is movable between an expanded unlocked state in which the second locking surfaces are not forced against the first locking surfaces and a contracted locked state in which the second locking surfaces are forced against the first locking surfaces.

The chain or belt arrangement may be arranged to surround an outer surface the first and second flanges in the closed position. The chain or belt arrangement may be arranged to surround an outer circumferential surface the first and second flanges in the closed position. The chain or belt arrangement may comprise a flexible chain arrangement. The flexible chain arrangement may comprise a plurality of clamp elements which include second locking surfaces which engage in a form-locking manner with first locking surfaces arranged on the first and second flanges.

The system may further comprise a tightening mechanism structured and arranged to release and tighten the flexible chain arrangement, whereby the chain or belt arrangement is movable between a radially expanded position in which the second locking surfaces are not forced against the first locking surfaces and a radially contracted position in which the second locking surfaces are forced against the first locking surfaces. The tightening mechanism may be adapted to adjustable an overall circumferential length of the flexible chain arrangement. The tightening mechanism may be adapted to adjust an overall radial area of the flexible chain arrangement. The chain or belt arrangement may be arranged to at least partially surround the first and second flanges.

The chain or belt arrangement may be movable between a first position wherein clamp elements of the chain or belt arrangement are arranged in a radially outward position and a second position wherein the clamp elements are arranged in a radially inward position. The chain or belt arrangement may be movable between a first position wherein clamp elements do not engage with each of the first and second flanges and a second position wherein the clamp elements engage with each of the first and second flanges, whereby the second position is radially inwards relative to the first position. The chain or belt arrangement may be movable between a first position wherein clamp elements engage with each of the first and second flanges and a second position wherein the clamp elements do not engage with each of the first and second flanges, whereby the second position is radially inwards relative to the first position. The first and second flanges may each comprise a first conical locking surface, wherein the chain or belt arrangement comprises second conical locking surfaces structured and arranged to engage the first conical locking surfaces when the structural part is in the closed position.

The first and second flanges may each comprise a first tapered locking surface, wherein the chain or belt arrangement comprises second tapered locking surfaces structured and arranged to engage the first tapered locking surfaces when the structural part is in the closed position. The first and second flanges may each comprise a first tapered locking surface and the chain or belt arrangement may comprise second tapered locking surfaces structured and arranged to engage the first tapered locking surfaces when the structural part is in the closed position, whereby the second locking surfaces generally correspond to the first locking surfaces. The chain or belt arrangement may remain arranged on the first flange when the structural part is in a opened position. The chain or belt arrangement may remain arranged on the second flange when the structural part is in a opened position. The chain or belt arrangement may comprise a sliding block surface which tapers outwards and which faces towards the first flange, whereby the chain or belt arrangement expands outwardly when sliding block surface engages with the first flange. The chain or belt arrangement may comprise clamp elements having sliding block surfaces which taper outwards and which face towards the first flange, whereby the chain or belt arrangement expands outwardly when sliding block surfaces engage with the first flange.

The chain or belt arrangement may comprise a sliding block surface which tapers outwards and which faces towards the second flange, whereby the chain or belt arrangement expands outwardly when sliding block surface engages with the second flange. The chain or belt arrangement may comprise clamp elements having sliding block surfaces which taper outwards and which face towards the second flange, whereby the chain or belt arrangement expands outwardly when sliding block surfaces engage with the second flange. The system may further comprise a tightening mechanism for radially expanding and contracting the chain or belt arrangement. The tightening mechanism may comprise a thread tightener acting between respective opposite ends of the chain or belt arrangement and a helical gear for rotating the thread tightener. The helical gear may comprise a gear wheel and a worm wheel. The gear wheel may be coupled to the thread tightener and the worm wheel is coupled to a drive element. The drive element may be a hand twist grip. The hand twist grip may be coupled to the worm wheel via a ball lock adapted to be unlocked via one of an operating element and a push button. The hand twist grip may be movable in a direction of a axis of rotation of the drive element between a lowered position, in which the hand twist grip is secured against rotation, and another position in which the hand twist grip is capable of rotating. The tightening mechanism may further comprise a spring arranged to move the hand twist grip, whereby the spring can move, during unlocking, the ball lock from the lowered position to the other position.

The tightening mechanism may comprise an inflatable hose arranged between clamp elements and a contact surface which is spaced from the clamping elements. The inflatable hose may be adapted to inflate via one of a hydraulic medium and a pneumatic medium. The system may further comprise a pressure pump coupled to the inflatable hose, wherein the pressure pump is structured and arranged to inflate the pressure hose. Inflation of the pressure hose may cause a radial expansion of the chain or belt arrangement. Inflation of the pressure hose may cause a radial contraction of the chain or belt arrangement.

The system may further comprise a mechanism for biasing chain or belt arrangement from an expanded state to a contracted state. The system may further comprise a mechanism for biasing chain or belt arrangement from a contracted state to an expanded state. The system may further comprise a mechanism for automatically biasing chain or belt arrangement from an expanded state to a contracted state. The system may further comprise a mechanism for automatically biasing chain or belt arrangement from a contracted state to an expanded state. The chain or belt arrangement may be adapted to automatically move a contracted state to an expanded state. The chain or belt arrangement may be adapted to automatically move from an expanded state to a contracted state. The locking arrangement may further comprise an inflatable hose, wherein clamp elements of the chain or belt arrangement are radially displaceable by removing a fluid from within the inflatable hose.

The locking arrangement may further comprise an inflatable hose, wherein clamp elements of the chain or belt arrangement are radially displaceable by feeding a fluid into the inflatable hose. The vehicle may comprise an aircraft. The structural part may comprise one of a radome, a maintenance hatch, an inspection hatch, a landing-gear door system, and a passenger door.

The invention also provides for a system for locking a movably mounted structural part to a support structure of a vehicle, wherein the system comprises at least one hinge pivotally connecting the structural part to the support structure and a locking arrangement structured and arranged to releasably connect at least one flange of the structural part to at least one flange of the support structure. In the closed position, the locking arrangement is arranged to lock the structural part to the support structure such that the at least one hinge is substantially free of forces normally acting on the at least one hinge when the structural part is in a opened position.

The invention also provides for a system for locking a movably mounted structural part to a support structure of a vehicle, wherein the system comprises at least one hinge pivotally connecting the structural part to the support structure and a locking arrangement structured and arranged to releasably connect at least one curved flange of the structural part to at least one curved flange of the support structure. The locking arrangement comprises a chain or belt arrangement and a mechanism for moving the chain or belt arrangement between an expanded state and a contracted state.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 9a-9c show individual phases of a closing sequence of the locking device;

FIGS. 10a and 10b show diagrammatic views which illustrate the operational principle of the locking device;

FIGS. 11a and 11b show detail views of a tightening mechanism used for opening and closing the locking device;

FIGS. 12a-12c show cross-sectional views of a helical gear for operating the locking device;

FIG. 18 shows a plan view of the access flap shown in FIG. 16 in the opened state from the outside of the aircraft;

FIGS. 19a-19c show cross-sectional views of a helical gear for operating the locking device of the access flap shown in FIG. 16 according to an exemplary embodiment of the invention;

FIGS. 22a-22c show a cross-sectional view and plan views of the passenger door shown in FIG. 21 in closed and in opened positions;

FIG. 25 shows a cross-sectional view through the two-leaved landing-gear door of FIG. 24 along the line A-A in the closed state (indicated by a solid line) and in the opened state (indicated by a dot-dash line);

FIGS. 26a-26c show individual phases of a closing sequence of a locking device according to a further exemplary embodiment, and as is explained on the basis of the landing-gear door shown in FIGS. 24 and 25;

FIGS. 27a and 27b show isometric views of a closure device in the form of a passenger door according to a further exemplary embodiment of the invention in the closed state, as seen from inside the aircraft or in the opened state seen from outside the aircraft; and FIGS. 28a and 28b show a detailed view in sectional form along the line B-B in FIG. 27a according to a further exemplary embodiment of the invention which is provided for locking the passenger door shown in FIG. 27.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

According to the invention, a closure element, which in general can be a structural part, e.g., a cover or a door, is arranged on a support structure in a moveable manner. The closure device, in general, is provided to pivot the closure element arranged, e.g., on the outer contour of a support structure (e.g., a vehicle), in order to be able to open and close and lock an access opening of the support structure. In particular, the support structure can be a vehicle structure into the interior of the same one can obtain access.

Figure 1:
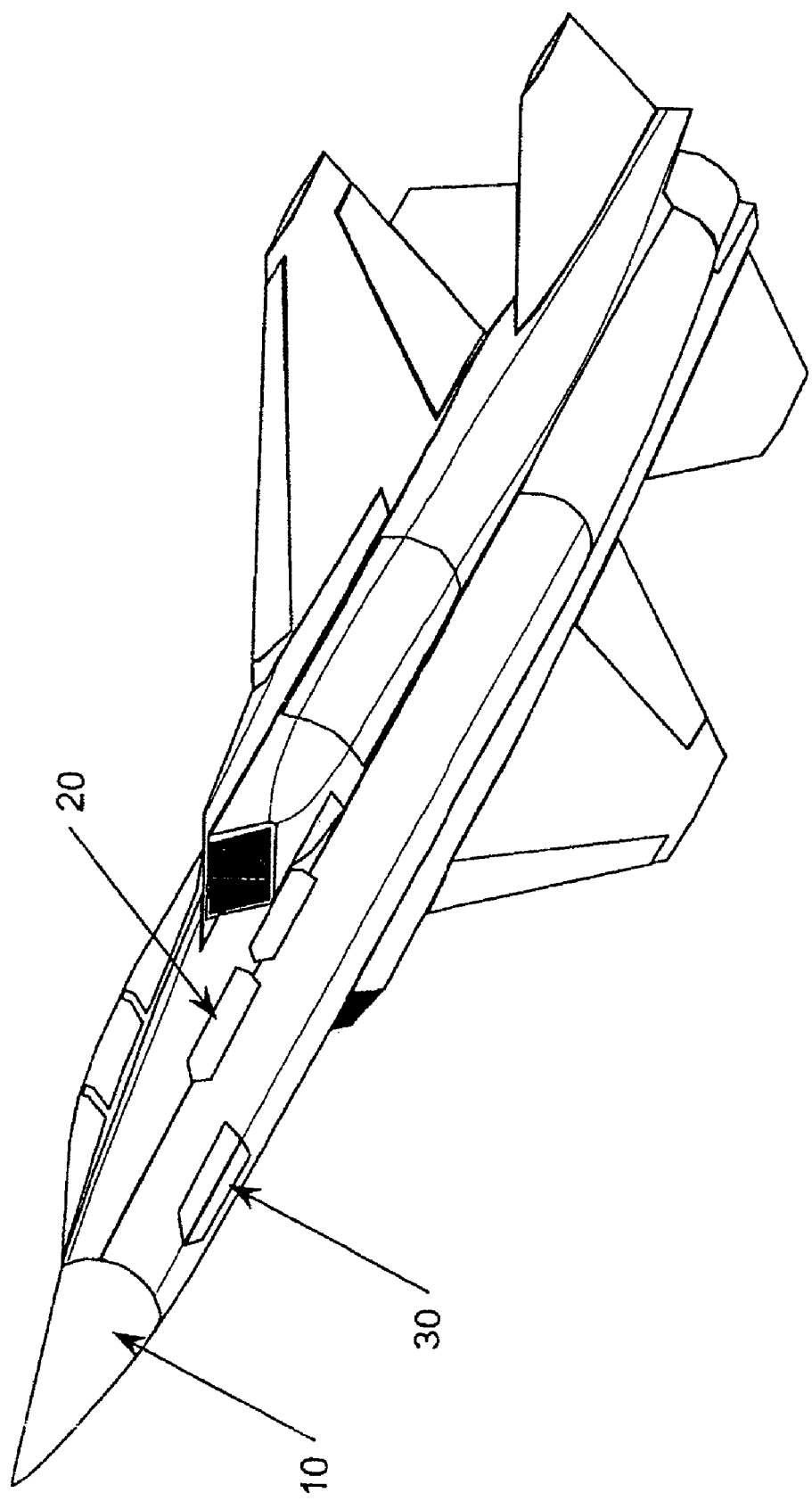
FIG. 1 shows an isometric view of a combat aircraft in which exemplary embodiments of the closure device according to the invention can be used.
Figure 2:
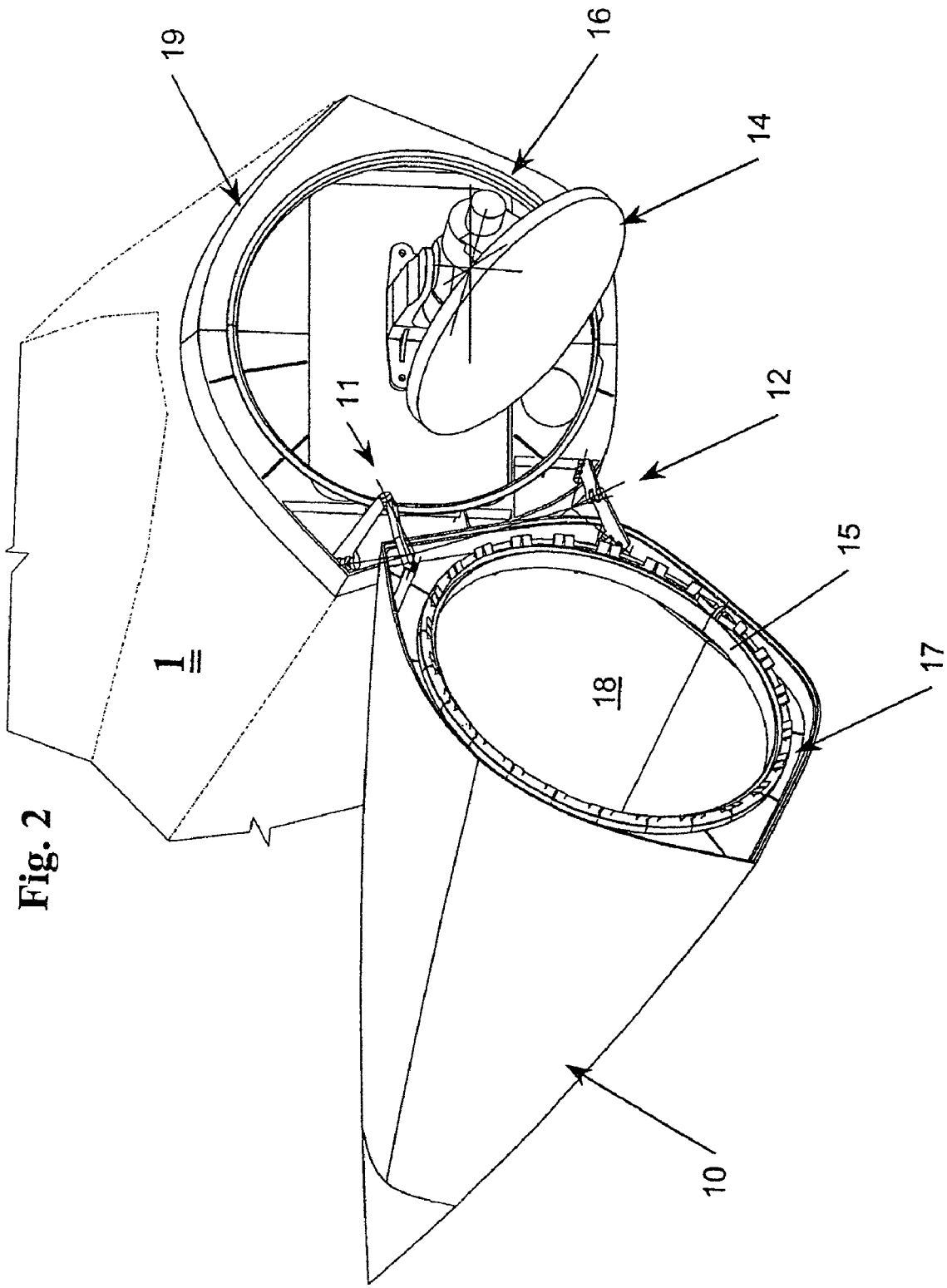
FIG. 2 shows an isometric view of a radome of a combat aircraft as shown in FIG. 1. The radome is in the opened state and uses a first exemplary embodiment of the invention.
Figure 3:
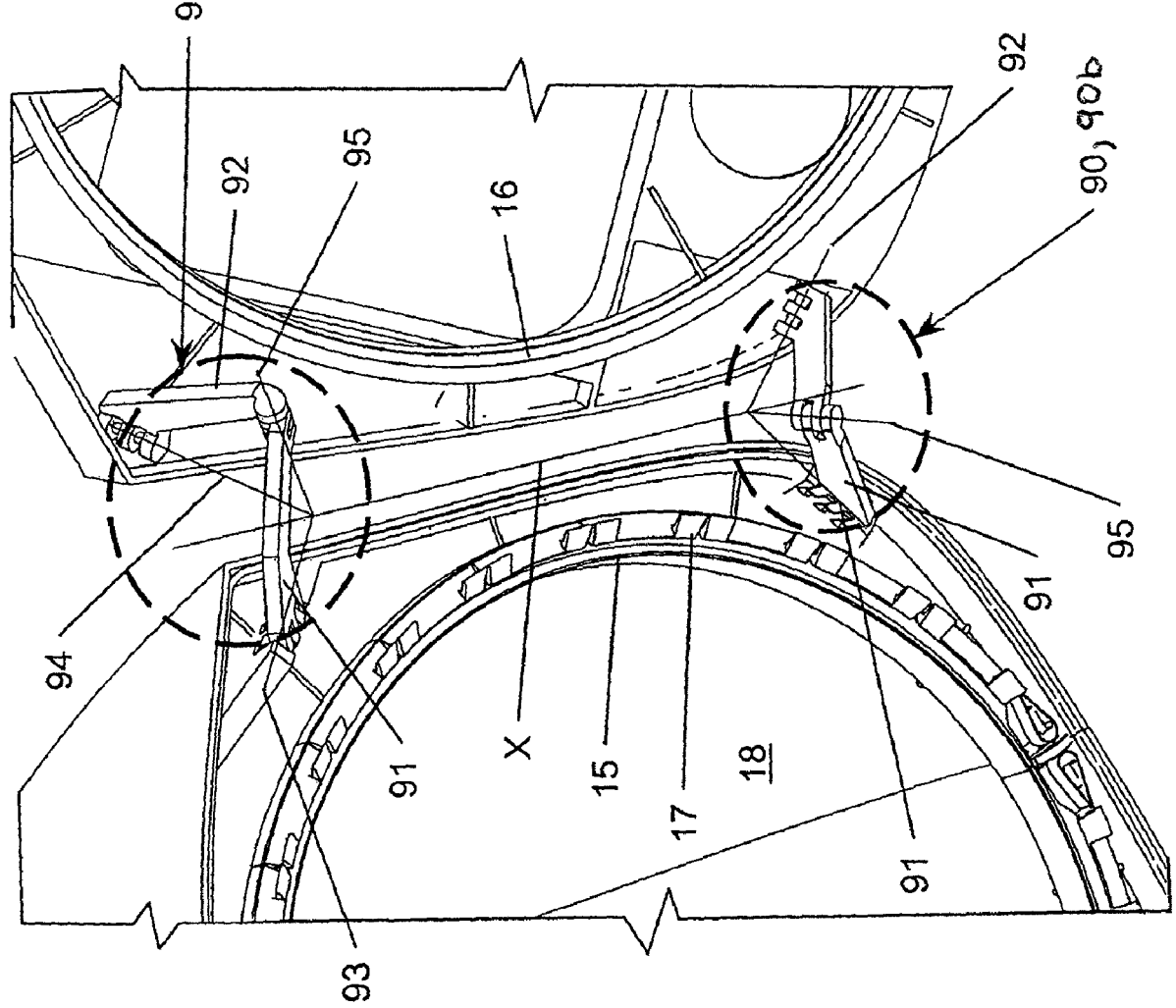
FIG. 3 shows a detailed view of a hinge system of the radome shown in FIG. 2.

The closure device according to the invention can be used, e.g., to open and close a radome arranged on an aircraft. In this example, the aircraft is the aforementioned structural part or support structure. Thus, FIG. 1 shows in isometric view a combat aircraft 1 on which the closure device according to the invention can be used according to one or more of the exemplary embodiments of the invention. As can be seen in FIGS. 1-3, a radome 10 is arranged to cover a front radar scanner 14 of the aircraft 1. One or more closure elements 20 in the form of access flaps or hatches are provided for inspection or maintenance purposes on the aircraft. As will be explained in detail below, landing gear doors 30 can also utilize the closure device of the invention.

FIG. 2 shows in isometric view an embodiment of the closure device used with a radome 10. In this embodiment, the radome 10 constitutes the closure element and the aircraft 1 constitutes the support structure. In the position shown in FIG. 2, the radome 10 is in the opened state. The closure element or the structural part in the form of the radome 10 is pivoted opened and closed by way of one or more hinged joint devices 90 (see also FIG. 3). In the embodiment shown in FIG. 2, two hinged joints 11, 12 are arranged on a support structure 19 of the aircraft 1. The radome 10 can be opened and closed in order to make accessible certain internal mechanisms. For example, the radome 10 can be opened to provide access for maintenance a radar scanner 14 covered by the radome 10. When closed, the radome 10 forms part of the outer contour of the aircraft 1. The scanner 14 is accommodated in a passage opening 18. A first flange 15 is provided on the radome 10. A second flange 16 is arranged on the support structure 19 of the aircraft 1. These flanges 15, 16 form, together with a chain or belt arrangement 17, a locking device with which the radome 10 can be fixed and securely held on the structure 19 of the aircraft 1. The locking device is such that it can lock the radome 10 to the structure 19 while essentially completely relieving the hinged joints 11, 12.

In general, therefore, a first flange 15 is arranged on the closing element or structural part 10, and a second flange 16 is arranged on the support or vehicle structure. These flanges 15 and 16 rest against one another and thereby interact in a form-locking manner in the closed position of the closure device. In this way, the structural part 10 can close the access opening 18 of the vehicle 1. From the point of view of the side to which the structural part can be pivoted into an open position, the hinged joint device(s) are arranged inside the vehicle structure and feature an axis of rotation X which is located outside the vehicle structure for moving the structural part 10. The locking device is thereby embodied such that in the closed state it locks the structural part 10 with the support structure 19 in a form-locking manner while relieving the hinged joint arrangements.

According to the invention, a hinged joint arrangement 90 includes at least one hinged joint. In the embodiment shown in FIG. 3, the hinged joint arrangement 90 is formed by two hinged joints in the form of two so-called pyramid gears 90a and 90b. Each gear 90a and 90b is composed of a first leg 91 and a second leg 92 and these legs are connected to one another at their first end by a common axis or swivel axis 95. The first leg 91 is also connected at its second end via a first axis or fixed axis 93 to the radome 10. The second leg 92 is connected at its second end via a second axis or fixed axis 94 to the structure 19 of the aircraft 1. The first and the second axis 93, 94 are respectively oriented at an angle to the common axis 95 which can typically lie in the range of between approximately 40° and approximately 80°. As can be seen at the lower hinge in FIG. 3, when the radome 10 is opened, a pivoting about a virtual axis of rotation labeled X occurs. This axis of rotation lies outside the outer contour of the aircraft 1. This also means that the axis of rotation X of the structural part 10, about which the same can be pivoted during opening and closing, is located on the side to which the structural part 10 can be pivoted to open.

The term pyramid gears 90a, 90b describes the property of the hinged joint devices 90a, 90b according to which the three axes, i.e., the first axis 93, the second axis 94 and the center axis 95, intersect at a common point. This point is located on the axis of rotation of the closure device in order to avoid a mechanical incompatibility (jamming) of the hinged joint devices.

Figure 23:
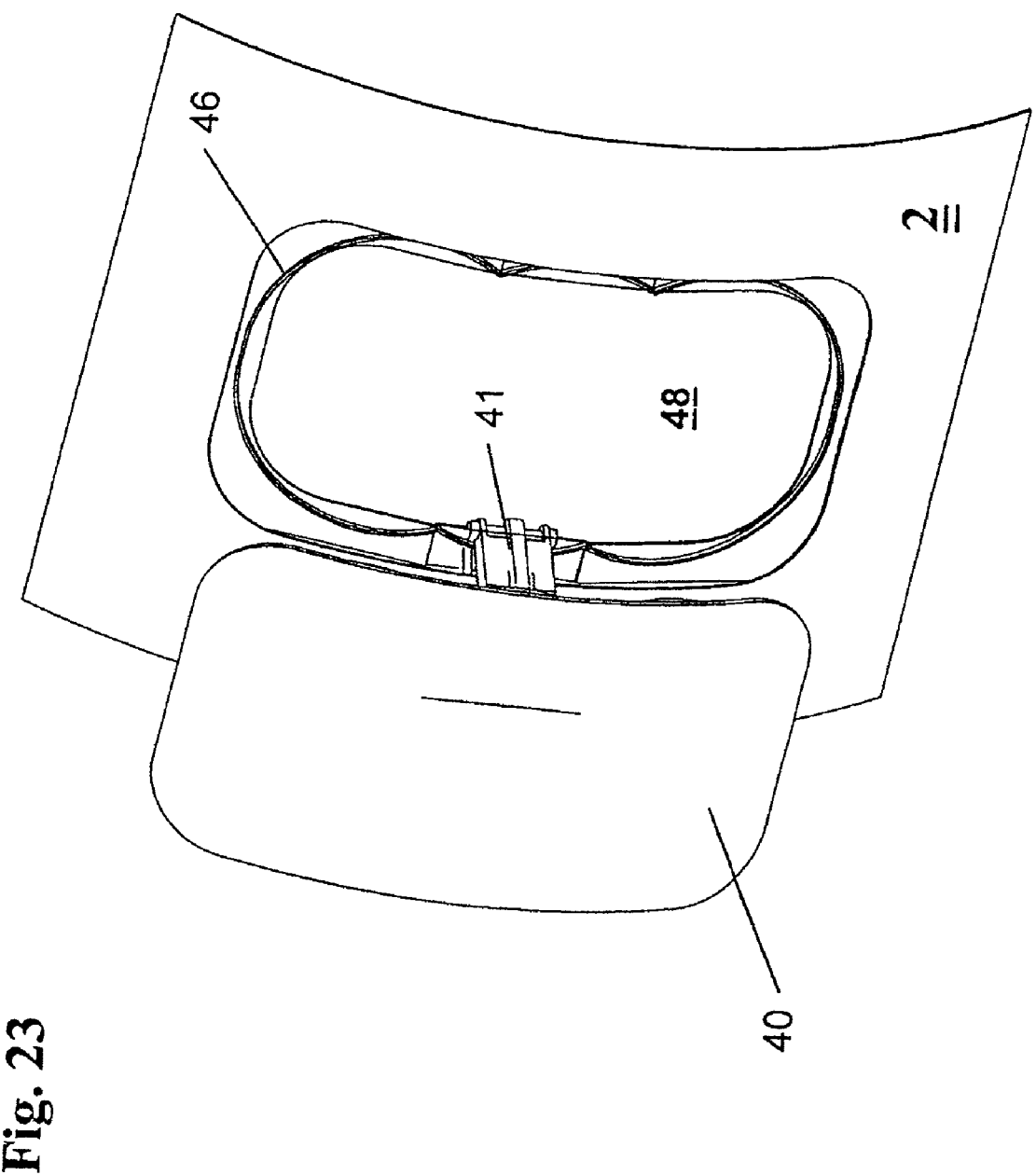
FIG. 23 shows an isometric view of the passenger door shown in FIG. 21 with a hinge mechanism according to an exemplary embodiment of the invention.

In general, the at least one hinged joint device 90 can also be embodied as a parallelogram hinged joint device in which the hinged joint device is composed of two legs which are flexibly coupled to one another (see e.g., FIGS. 23 and 27). The first leg can be attached to the structural part and the second leg can be attached to the support structure, whereby the joint axes of the two legs run parallel and/or in the direction of the axis of rotation X of the closure device.

In any case, the axis about which the structural part can be pivoted is arranged outside the vehicle structure from the point of view of the side to which the structural part can be pivoted into an open position.

With the hinged joint device having the form of a pyramid gear 90, the pivoting about the axis of rotation X is caused, on the one hand, by opening the first and second legs 91, 92 which rotate about their common swivel axis 95, and on the other hand, by rotating the legs 91, 92 about the fixed axes 93, 94. With the pivoting motion about the virtual axis of rotation X, the structural part or the radome 10 is fixed with respect to the supporting structure 19 virtually in the same manner as would be the case with a pivoting about a hinge with an actual axis of rotation in place of the virtual axis of rotation X.

Figure 4:
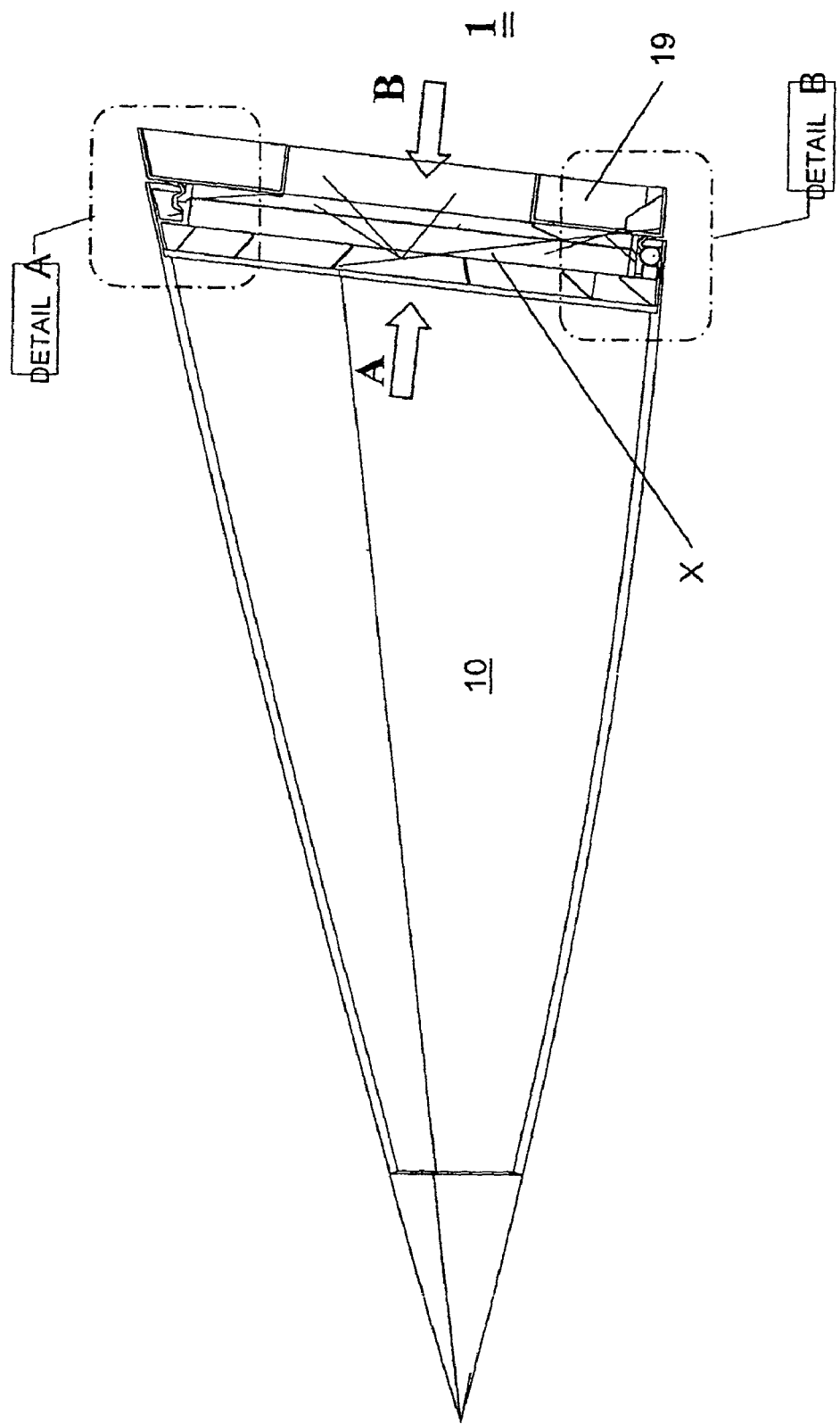
FIG. 4 shows a section view of the radome shown in FIG. 2 in the symmetry plane in the closed state.
Figure 5:
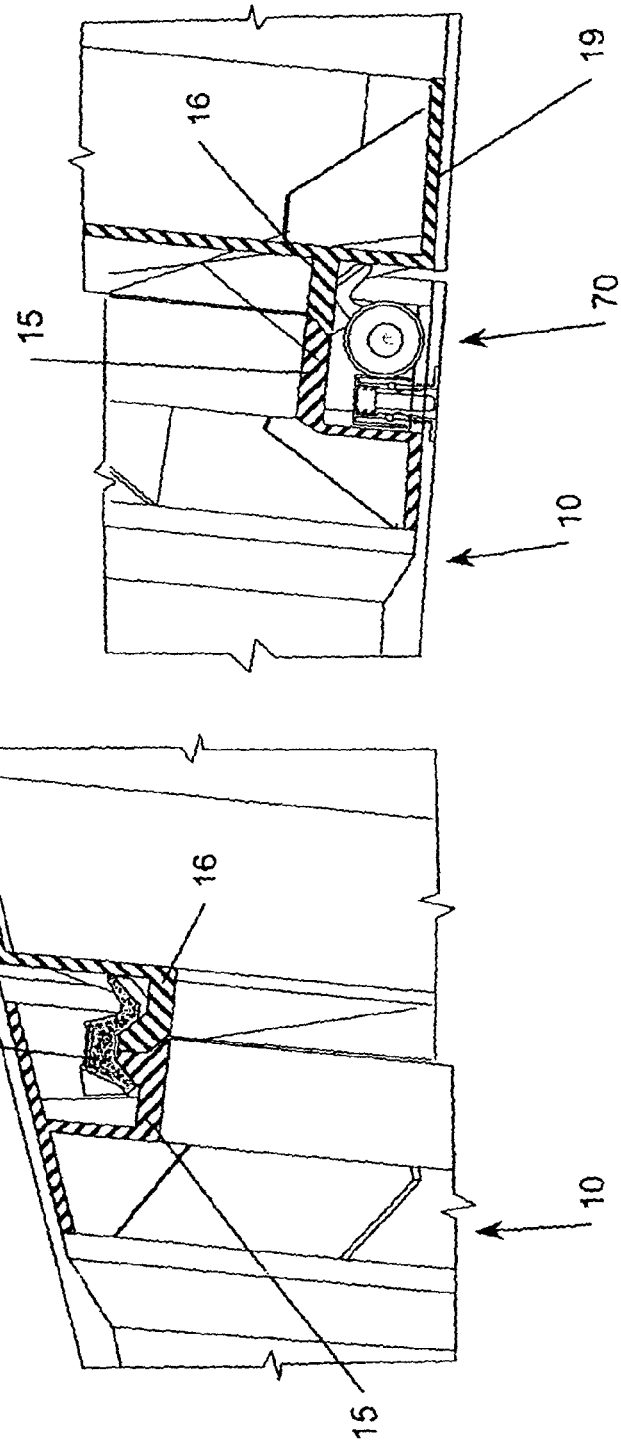
FIGS. 5a and 5b show detailed views of a locking device that serves to lock the closure device of an exemplary embodiment of the invention.

In the closed position shown in FIG. 4, it can be seen that the radome 10 is attached to the structure 19 of the aircraft 1 by way of a locking device. Details A and B are shown in FIGS. 5a and 5b. The locking device includes a first flange 15 that is arranged on the structural part or radome 10 and a second flange 16 that is provided and/or arranged on the structure 19. The flanges 15, 16 are embodied such that they interact in a form-locking manner. Furthermore, the locking device features a blocking or locking arrangement 17 that can be embodied, in particular, as a chain or belt arrangement (see FIGS. 5a, 5b). In the closed state, the locking arrangement 17 provides a form-closed locking between the first flange 15 and the second flange 16. The blocking device or the chain or belt arrangement also includes a tightening mechanism 70 with which the chain or belt arrangement can be tightened onto or loosened from the flanges 15, 16.

Figure 6:
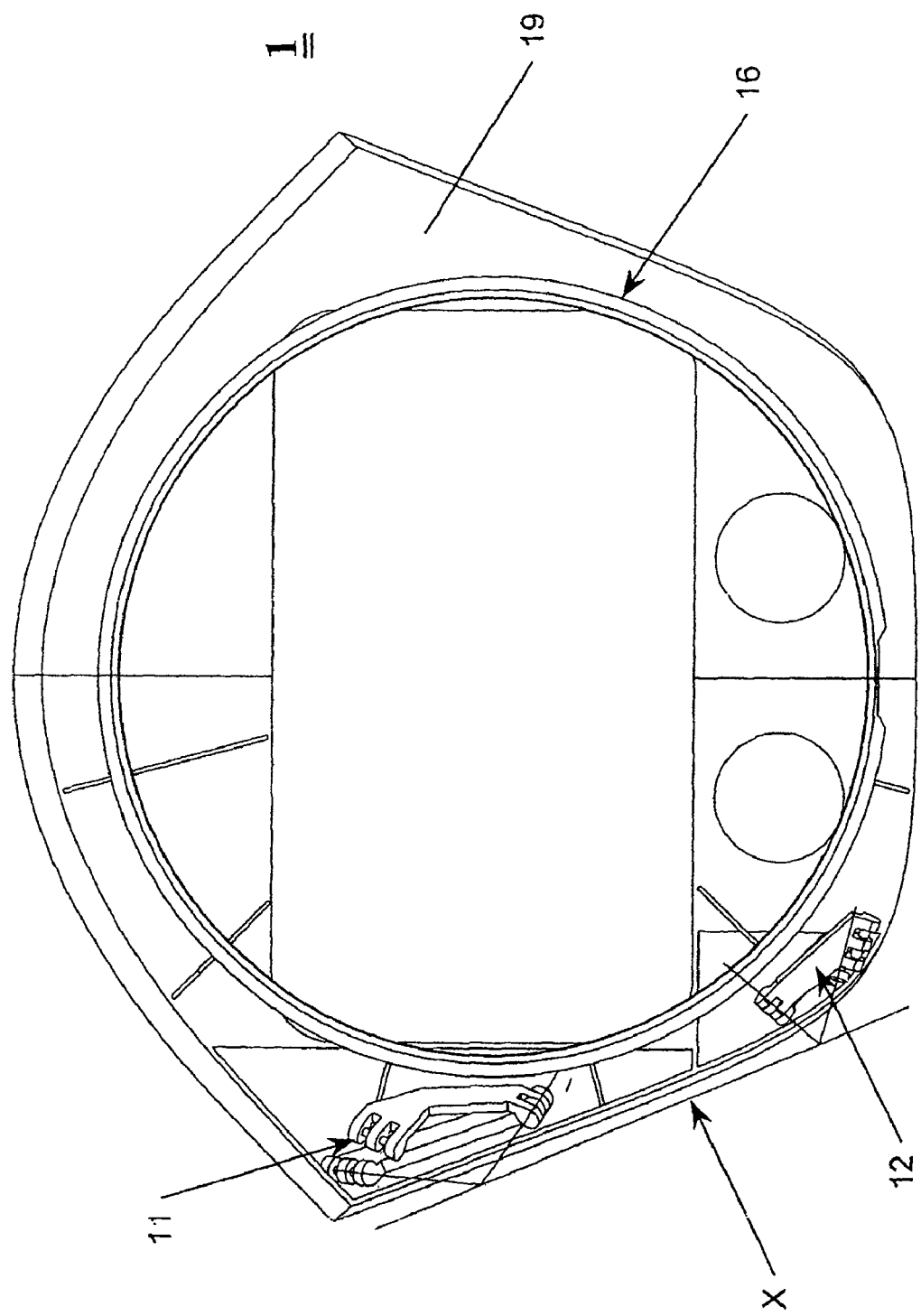
FIG. 6 shows a plan view of the front structural spar of the aircraft shown in FIG. 1 to which the radome (not shown in the Fig.) is attached.
Figure 7:
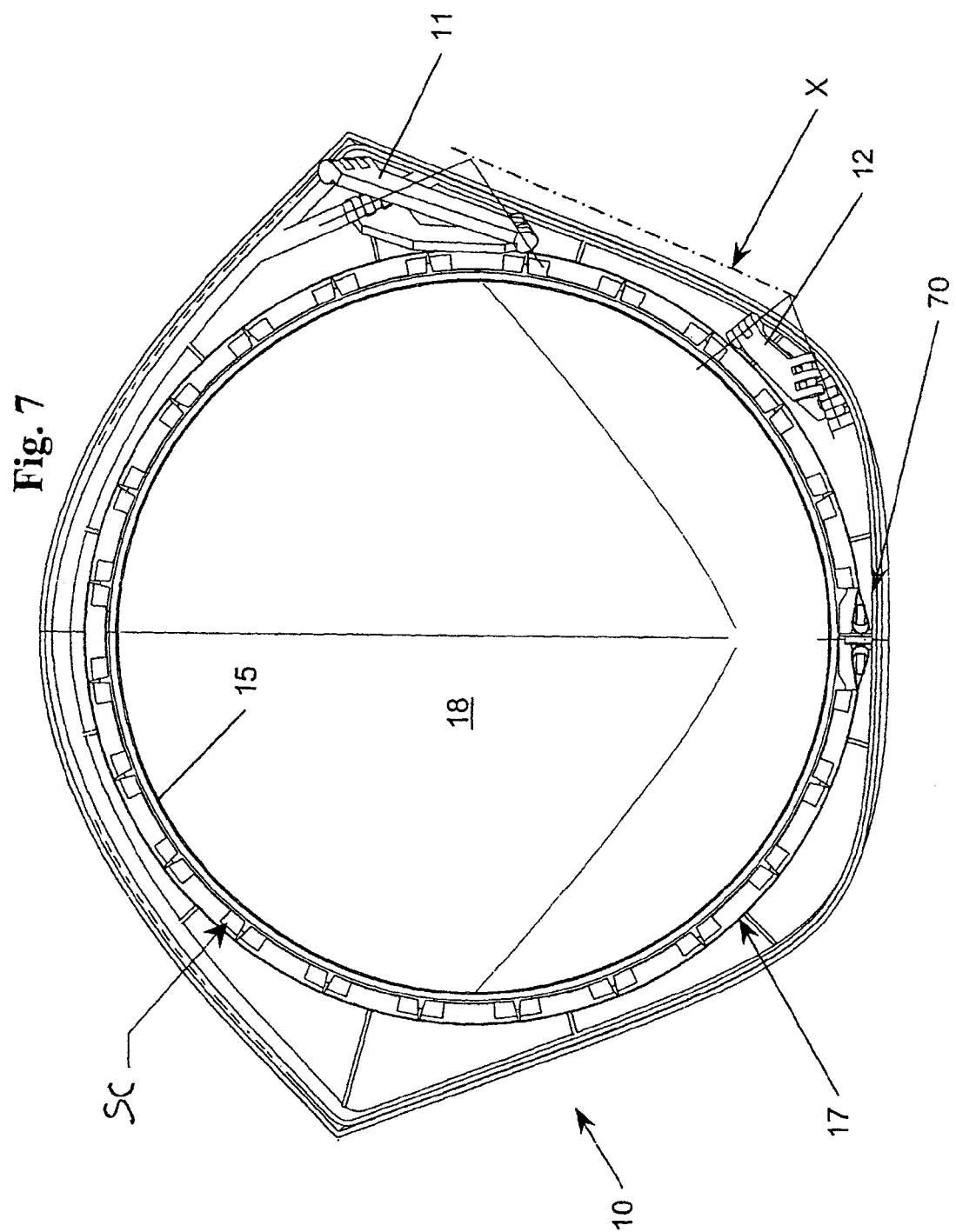
FIG. 7 shows a corresponding view of the radome with a locking device according to an exemplary embodiment of the invention.

FIGS. 6 and 7 show in plan view the second flange 16 provided on the structure 19 of the aircraft 1. The first flange 15 provided on the radome 10 together with the blocking device or chain or belt arrangement 17 and the tightening mechanism 70 is also shown. The chain or belt arrangement utilizes a sliding cam SC. The first flange 15 and the second flange 16 respectively form a curve running in a completely closed manner. In this exemplary embodiment, the completely closed curve is in the form of a complete circle. As is also evident in FIG. 7, the first flange 15 arranged on the radome 10 limits the circumference of the passage opening 18 that is provided for the radar scanner 14 to pass through.

The operational principle of the locking device formed by the first flange 15, the second flange 16 and the blocking device in the form of a chain or belt arrangement 17 will now be explained in more detail with reference to FIGS. 8 through 10. In the closed position of the closure device, and thus in the closed position of the radome 10, the first flange 15 and the second flange 16 rest against one another, see FIGS. 8 and 9c. As a result, the stop surfaces 56 and 57, which are arranged to face one another (see FIG. 9a) contact one another. A plurality of clamp elements 61 are provided on a flexible chain or belt arrangement. These clamp elements 61 are connected to one another by the chain or belt arrangement 60 (see FIGS. 9a and b and FIG. 10a and 10b). The clamp elements 61 feature respective second locking surfaces 64, 65 which interact in a form-locking manner with first locking surfaces 52, 53 provided on the sides of the flanges 15, 16 facing away from one another (see FIGS. 9a-9c).

The tightening mechanism 70, which in FIG. 10 is indicated only diagrammatically by arrows, is used to changed an overall length of the chain or belt arrangement 17 between an extended and/or expanded state, in which the first locking surfaces 52, 53 of the first flange 15 or of the second flange 16 and the second locking surfaces 64, 65 of the clamp elements 61 are free of one another so as to release the closure device 10, and a contracted state in which the first locking surfaces 52, 53 of the first and second flanges 15, 16 and the second locking surfaces 64, 65 of the clamp elements 61 are fixed and/or engage against one another to provide for locking engagement.

Figure 8:
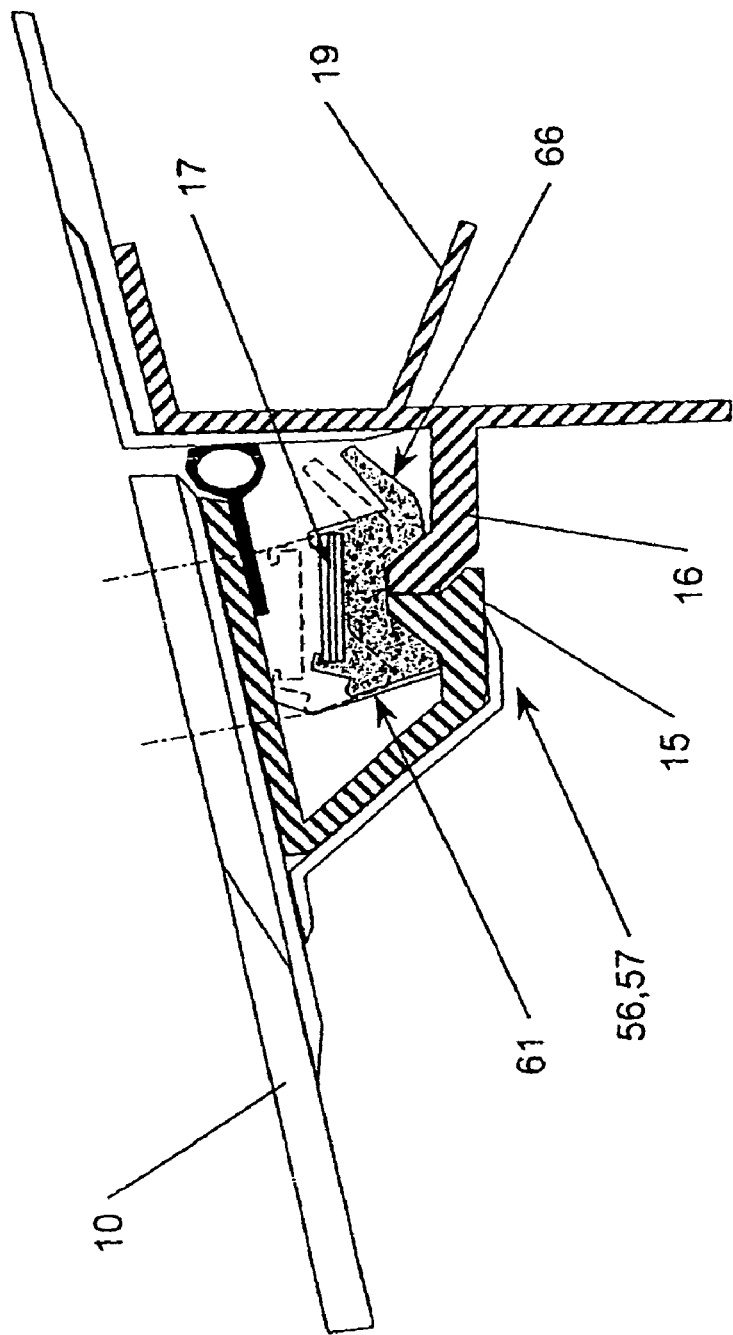
FIG. 8 shows a detailed view to explain the operational principle of the locking device.

As FIGS. 8 and 9 show, the first locking surfaces 52, 53 provided on the flanges 15, 16 form an outer conical cross-sectional shape which tapers outwards in the radial direction. The second locking surfaces 64, 65 provided on the clamp elements 61 form an inner conical cross-sectional shape which tapers outwards in the radial direction and which generally matches the cross-sectional shape of the first locking surfaces 52, 53. As a result, when the locking arrangement 17 and flanges 15 and 16 are in the position shown in FIGS. 9c and 10a, the closure device can be said to be locked a form-locking manner.

The chain or belt arrangement 17, which includes the chain or belt element 60 and the clamp elements 61 arranged thereon, is also arranged in a fixed manner with regard to one of flanges. In the exemplary embodiment shown, this flange is the first flange 15. As a result, the clamp elements 61 have, on the side facing the second flange 16, a sliding block surface 66 which is tilted or tapered outwards. In this way, the clamp elements 61 can, during closing of the locking device or movement of the flanges 15 and 16 towards one another, can be displaced radially outwards to engage the first locking surface 53 of the flange behind the assigned second locking surface 65 of the clamp elements 61.

The tightening mechanism 70, as can be seen in FIGS. 11a and 11n, can include a thread tightener acting between respective opposite ends 62, 63 of the chain or belt element 60. The thread tightener can include a threaded pin 71 arranged in a generally central position. The threaded pin 17 includes oppositely directed threads (e.g., right hand threads and left hand threads or left hand threads and right hand threads) on opposite ends. The thread tightener also includes thread blocks 72 and 73 arranged at the ends 62 or 63 of the chain or belt element 60, as known per se. A helical gearing is used for operating the thread tightener which contains a gear wheel 74 coupled to the threaded pin 71 in a rotationally locked manner and a worm wheel 75 engaged therewith and coupled to a drive element 80.

By way of non-limiting example, the drive element 80 is a hand twist grip that is coupled to the worm wheel 75 via a ball block. See FIGS. 12a-12c. The ball block is composed of an inner casing 87 provided with a groove 82, an outer casing 88 provided with a groove 83 and several balls 81 arranged in between. These balls 81 are deposited in recesses 85 that are embodied in the body 80a of the hand twist grip 80. The inner casing 87 is provided with a push button 84 arranged on an outside and accessible to an operator (see FIG. 12a). The push button 84, when pressed against the pressure of a spring 86, acts to release the balls 81 (see FIG. 12b). In this way, the hand twist grip 80 is released for movement outwards due to the action of a spring 89 (see FIG. 12c). As a result, the hand twist grip is displaceable in the direction of its axis of rotation between a lowered position, in which it is secured against rotation, and a raised or not lowered position in which it is released for rotation. In this latter position, the tightening mechanism 70 can be activated via the helical gearing 74, 75 and thus the chain or belt element 60 can be released.

Figure 13:
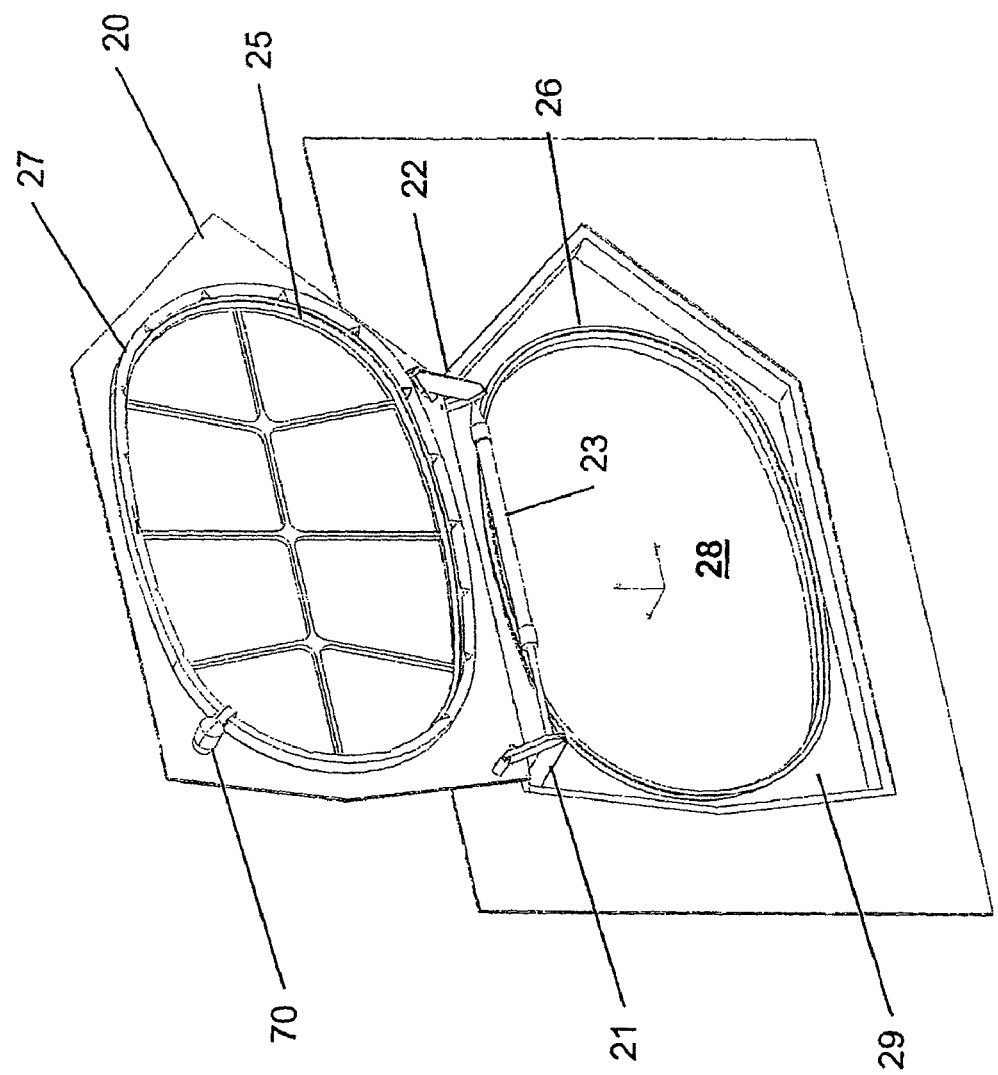
FIG. 13 shows an isometric view of a closure device in the form of an access flap according to a second exemplary embodiment of the invention in the opened state.
Figure 14:
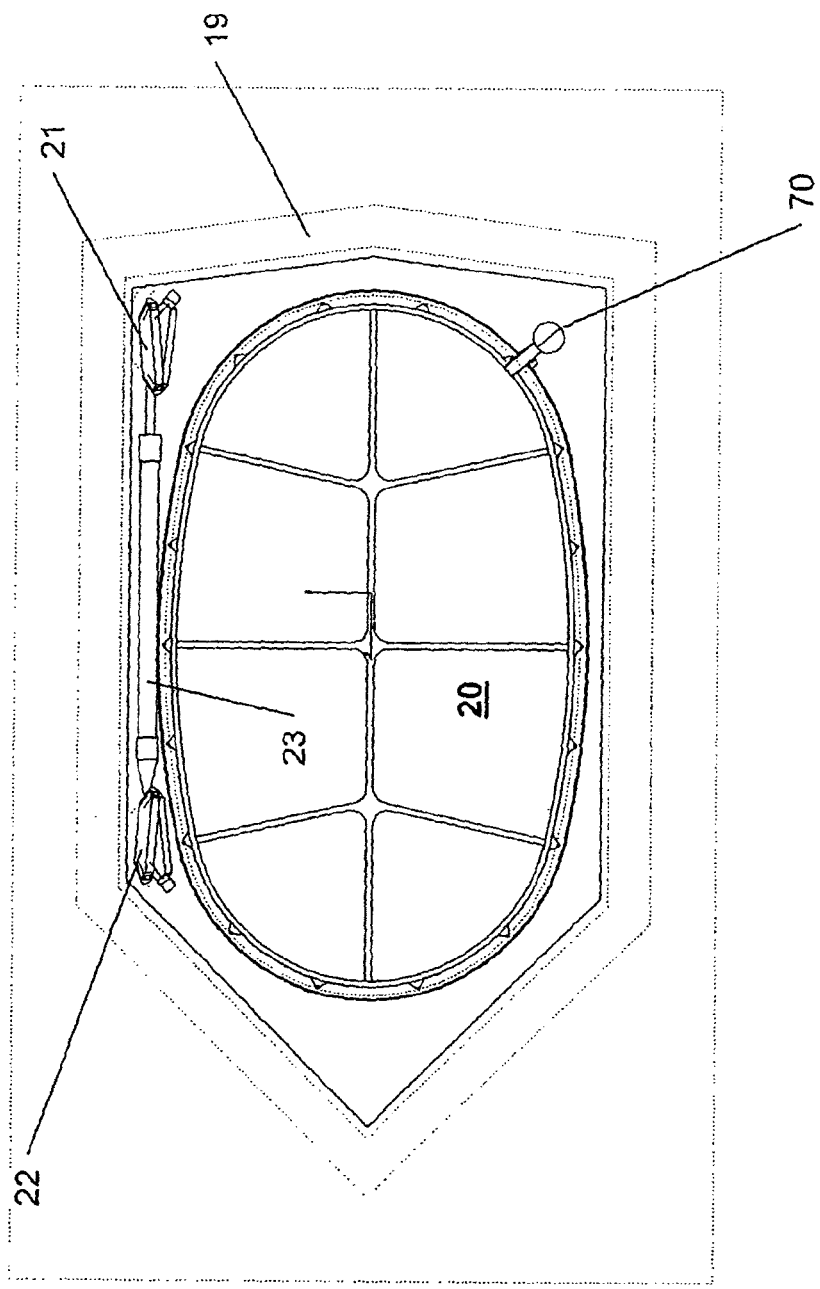
FIG. 14 shows a plan view of the access flap shown in FIG. 13 in the closed state from the inside of the aircraft.
Figure 15:
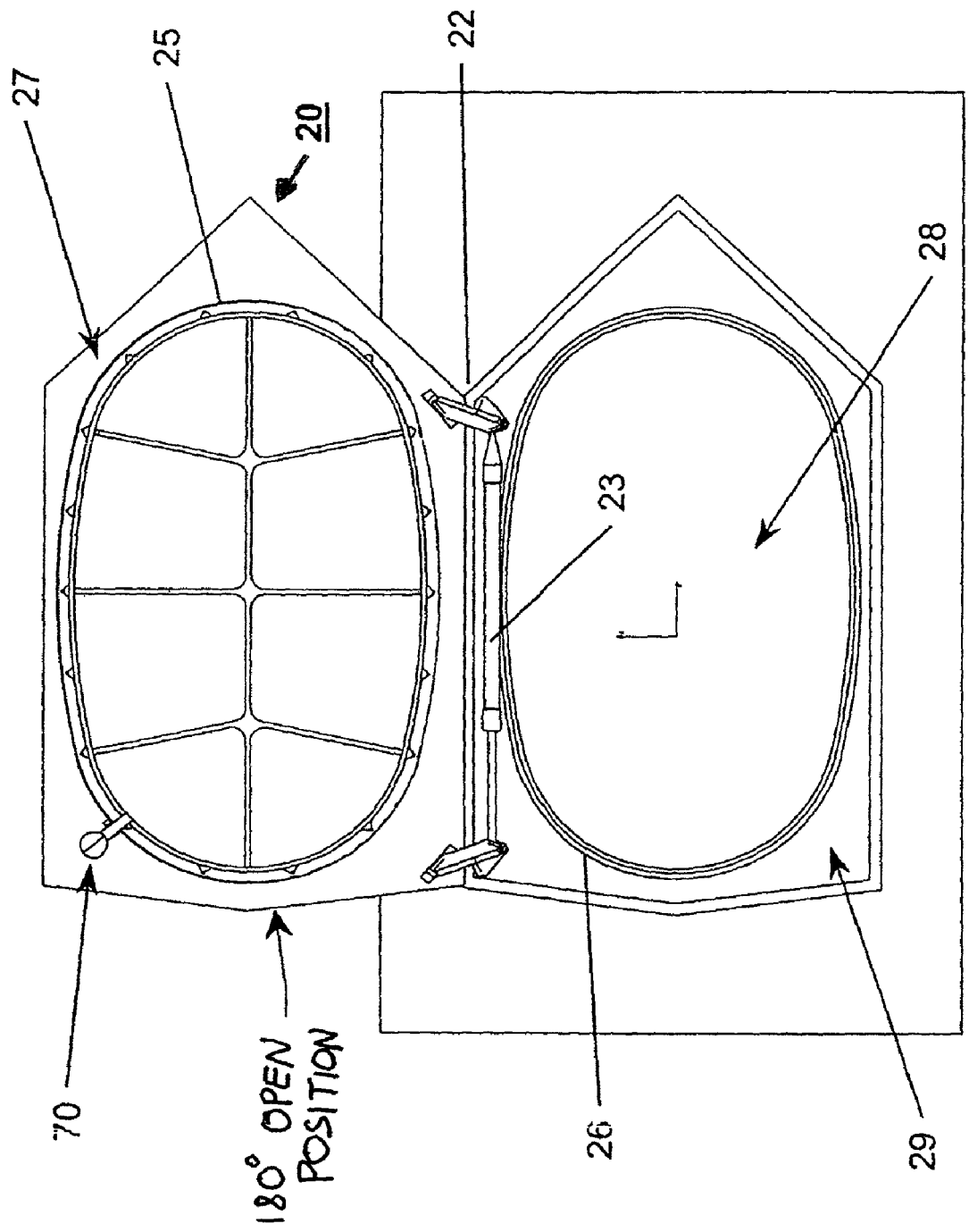
FIG. 15 shows a plan view of the access flap shown in FIG. 13 in the opened state from the outside of the aircraft.

FIGS. 13 through 15 show a second exemplary embodiment of the invention in which the structural part 20 is a maintenance or inspection cover. A passage opening 28 is provided in the vehicle structure 29 which again is an aircraft. This opening 28 can be closed with the cover 20. The cover 20 is connected to the structure 29 by hinges 21, 22, which can be the previously mentioned pyramid gears. Through the use of these pyramid gears a virtual axis of rotation lying outside the outer skin of the aircraft is again formed about which the cover 20 can be opened. In this embodiment, however, an opening of the cover 20 is facilitated by resort to a gas pressure mechanism 23 which that acts between the hinges 21, 22. Through the spring force of the gas pressure mechanism 23, the legs of the pyramid gearings are pressed apart in the area of their swivel axis. This produces an opening movement and causes an opening of the cover 20.

As with the previous embodiment, a first flange 25 is arranged on the structural part or cover 20 and a second flange 26 is arranged on the structure 29 of the aircraft. A locking device in the form of chain or belt arrangement 27 is used essentially in the same way as described for the first exemplary embodiment with reference to FIGS. 8 through 12. Here, too, the operation of the chain or belt arrangement 27 takes place by way of a tightening mechanism 70 as previously described.

Figure 16:
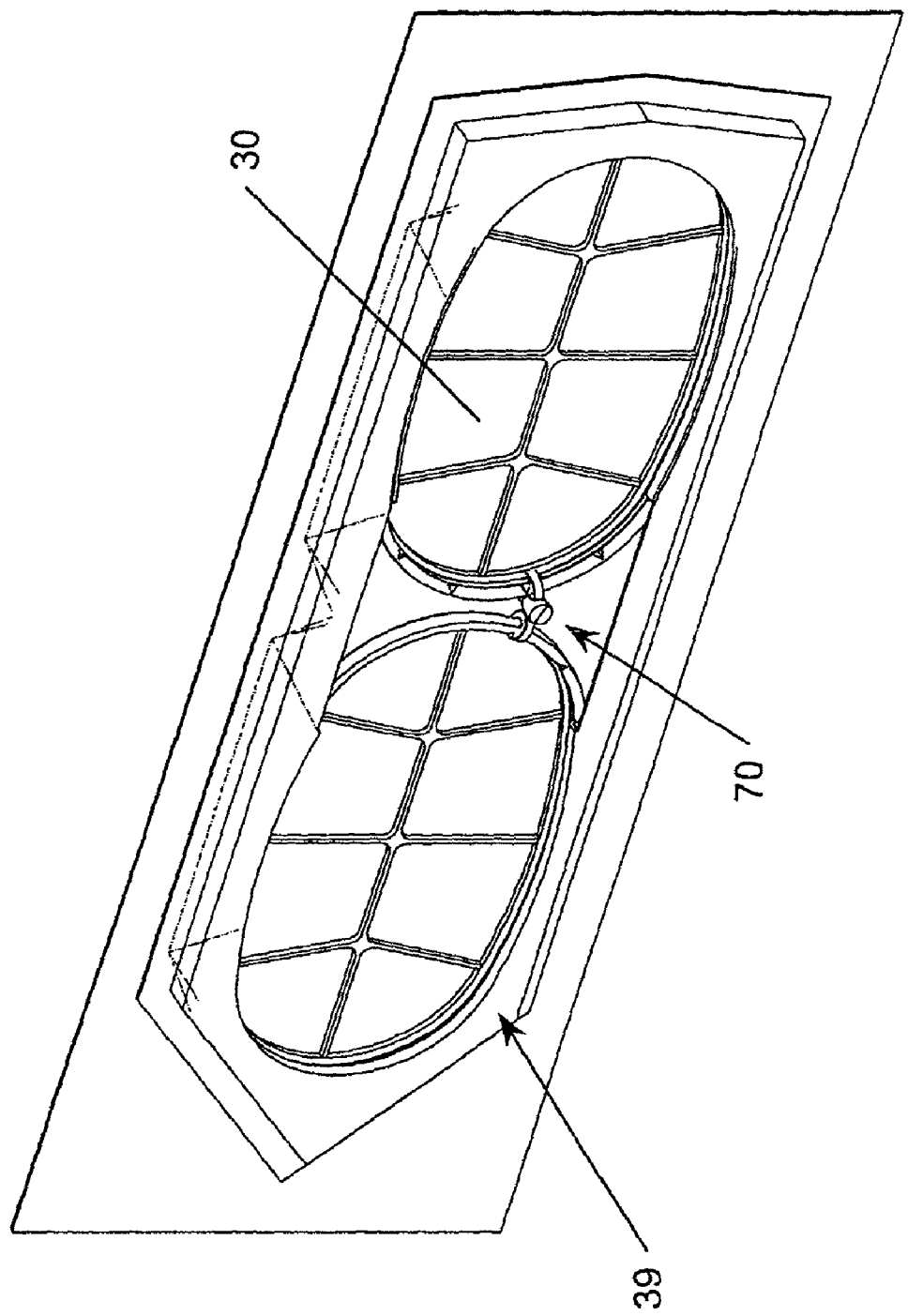
FIG. 16 shows an isometric view of a closure device in the form of an access flap according to a third exemplary embodiment of the invention in the closed state, seen from the inside of an aircraft.
Figure 17:
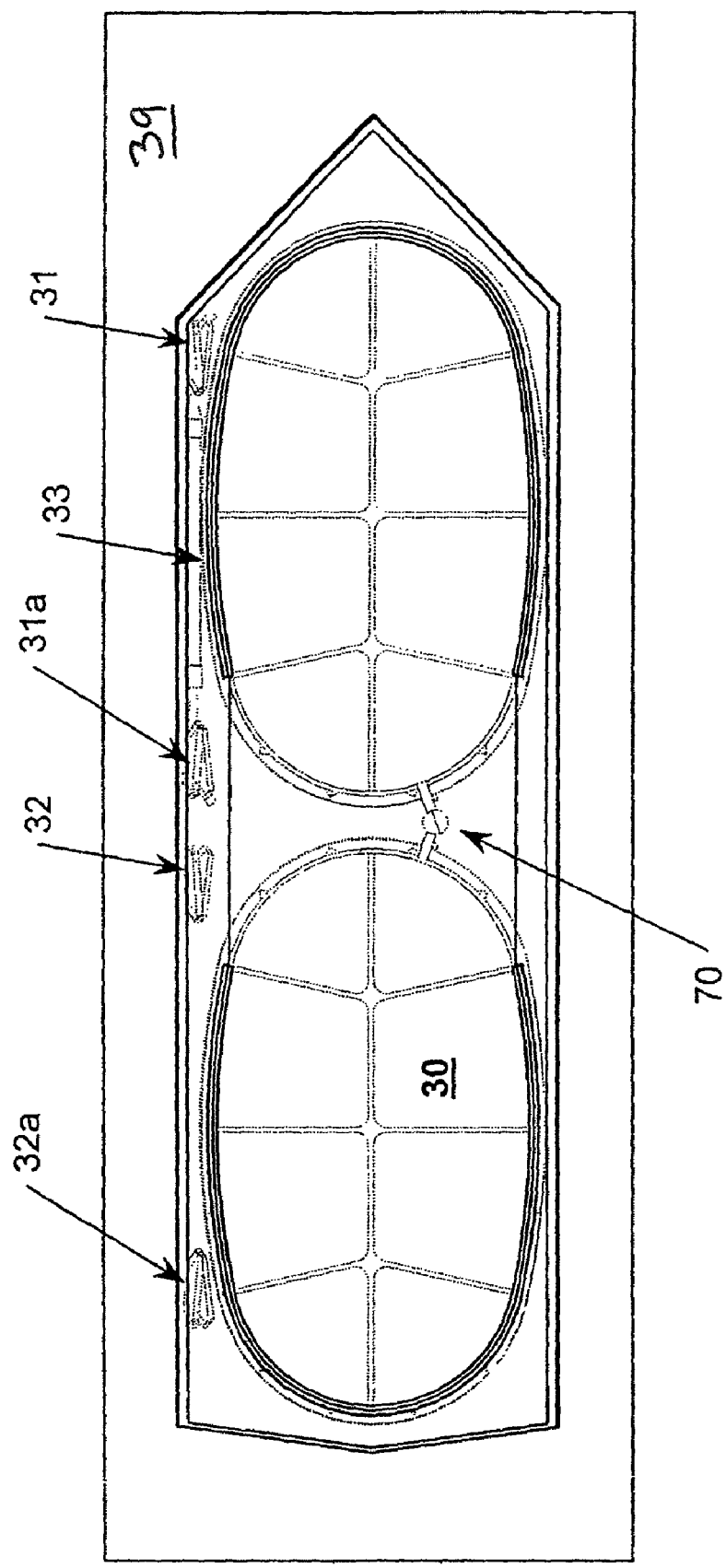
FIG. 17 shows a plan view of the access flap shown in FIG. 16 from the inside of the aircraft.
Figure 20:
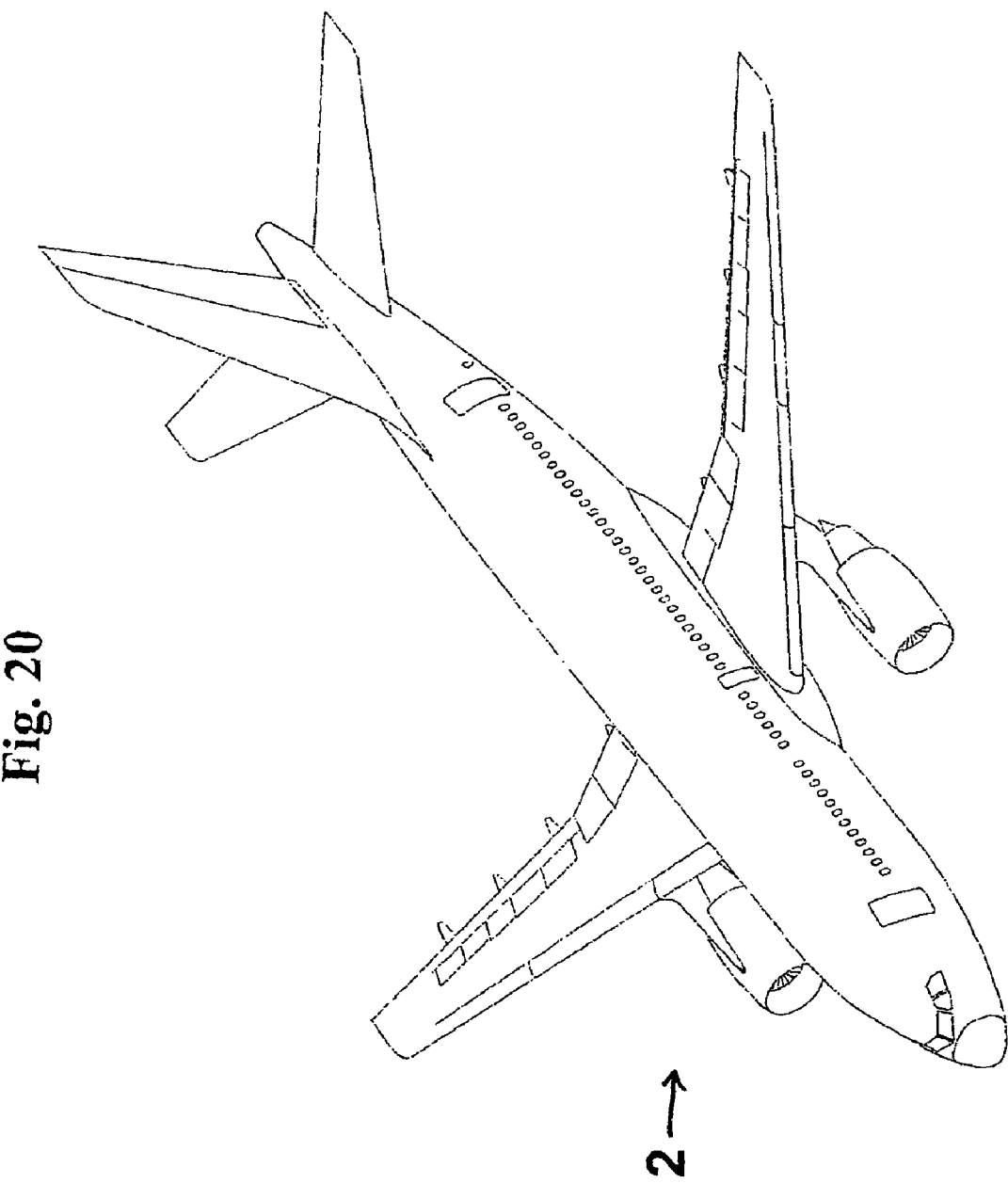
FIG. 20 shows an isometric view of a passenger aircraft in which closure devices according to exemplary embodiments of the invention can be used.

In the third exemplary embodiment shown in FIGS. 16 through 18, an inspection or maintenance cover 30 is illustrated. The cover 30 it is attached to the aircraft structure 39 by way of a hinge arrangement which includes hinges 31, 31a, 32, 32a. Here, too, the hinges 31, 31a, 32, 32a are pyramid gears of the previously described type.

A gas pressure mechanism 33 is arranged between the springs 31, 31a. The mechanism 33 provides the opening motion of the cover 30, in the same way as was previously described with reference to the second exemplary embodiment. In contrast to the second exemplary embodiment, however, here two first flanges 35, 35a are provided on the cover 30 which interact with two second flanges 36, 36a that are provided on the structure 39 of the aircraft having a passage opening 38. A chain or belt arrangement 37, 37a is thus provided on each of the first flanges 35, 35a. Each of these arrangements 37 and 37a can be operated by way of a common tightening mechanism 70.

The tightening mechanism 70 is shown in detail in FIGS. 19a-19c. The general operation is the same as with the tightening mechanism explained with regard to FIGS. 12a-12c. However, the geometry is slightly different with respect to the position of the closure devices 20; 30. FIG. 19b also illustrates a ball movement BM.

Finally, FIGS. 20-23 shows a passenger aircraft 2 which uses a fourth exemplary embodiment of the closure device 45 according to the invention for opening and closing a passenger door 40.

Figure 21:
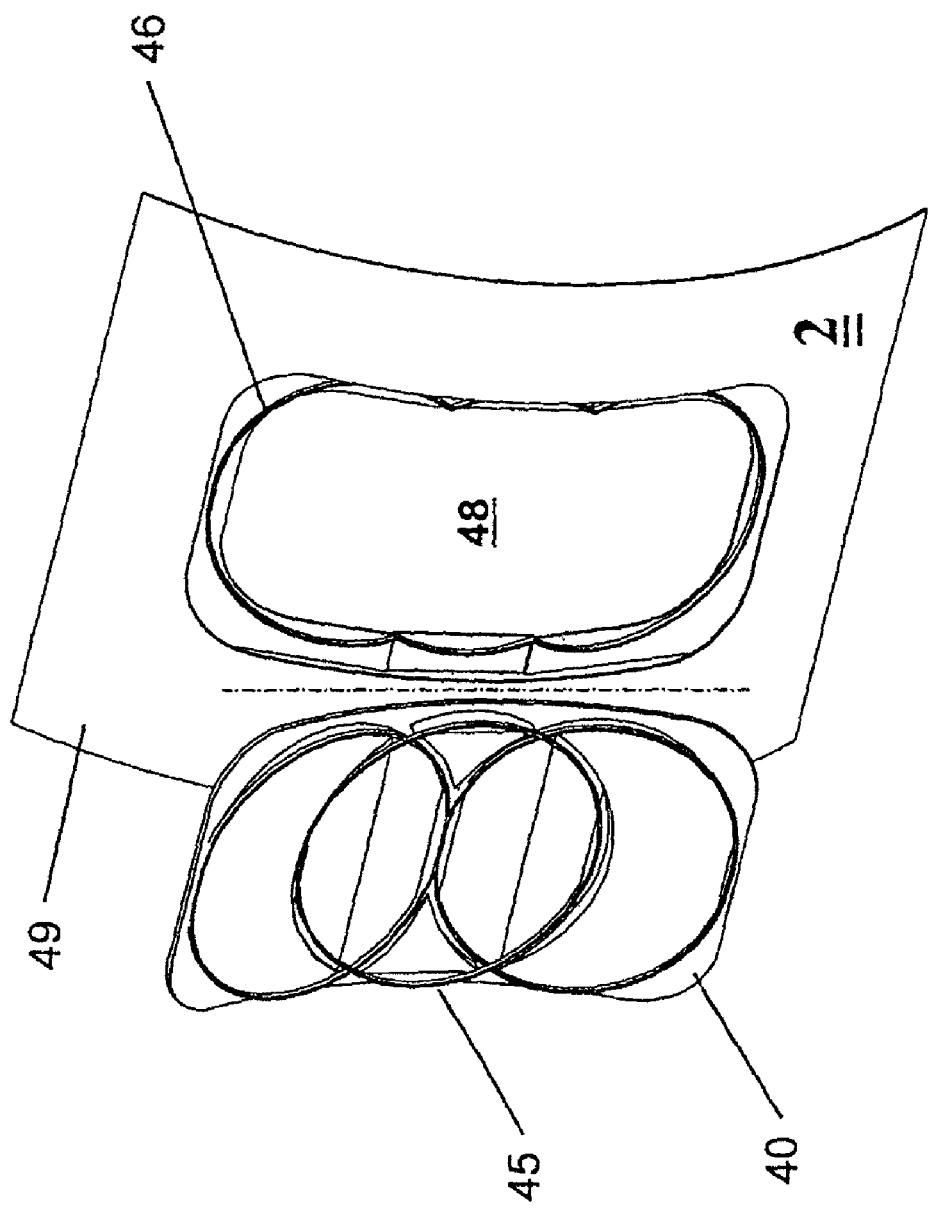
FIG. 21 shows an isometric view of a closure device in the form of a passenger door in the opened state seen from outside the aircraft.

The passenger door 40 is shown in more detail in FIGS. 21 through 23. As was the case in previous embodiments, a passage opening 48 is embodied in the structure 49 of the outer wall of the aircraft 2. This opening 48 is limited on its circumference by a flange 46. The closure device, which is partially arranged on the passenger door 40, includes three flanges 45a, 45b, 45c (see in particular FIGS. 22a and 22c). The flange 45 constitutes a first flange provided on the passenger door 40. A second flange 46 is provided on the structure 49 of the aircraft 2. Each of these flanges 45 and 46 are composed of several flange portions. In the example shown, these partial flanges are circular flanges. As can be seen in FIG. 22a, the flanges 45a, 45b, 45c (and also the flanges 46a, 46b, 46c) lie in different planes which intersect where the parts of the flanges 45, 46 touch one another. A chain or belt arrangement 47 has portions 47a, 47b and 47c which are arranged on the flanges 45a, 45b, 45c of the first flange 45. This arrangement 47 is used to lock the flanges 45 and 46 to each other during closing of the door 40. The operation is essentially the same as explained with reference to FIGS. 8 and 9. Here, too, a tightening mechanism 70 is provided that is used for the common operation of the same.

In this fourth exemplary embodiment, the hinge 41, through which the passenger door 40 is connected to the structure 49 of the aircraft 2, has the form of a parallelogram hinged joint device in which the first axis and the second axis and the center axis run parallel to one another.

Figure 24:
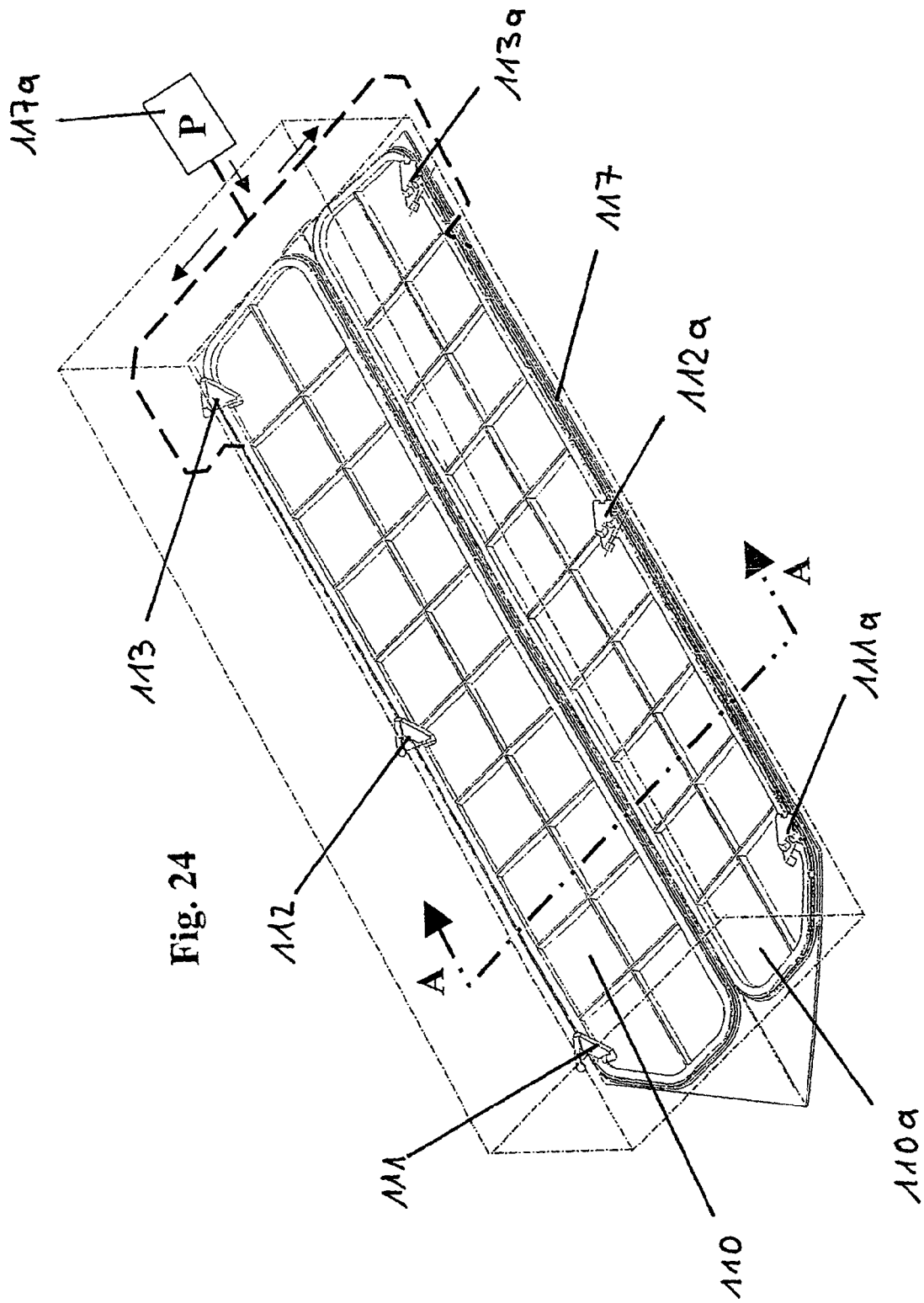
FIG. 24 shows an isometric view of a closure device in the form of a landing-gear door comprising two leaves, in the closed position, seen from inside the aircraft according to another exemplary embodiment of the invention.

FIGS. 24 through 26 show another exemplary embodiment of a closure device according to the invention. In this embodiment, the closure element is a two-leaved landing-gear door. The landing-gear door comprises a first leaf 110 and a second leaf 110a. Each leaf is respectively attached by hinges 111, 112, 113 and 111a, 112a, 113a to the structure 119 of the aircraft. In this way, the door can be mounted in a pivoted manner.

The hinges 111, 112, 113, 111a, 112a, 113a are formed as pyramid gears of the type described above, and again utilize a virtual axis of rotation X that lies outside the outer contour of the aircraft. As the sectional representation of FIG. 25 shows, an opening of the leaves 110, 110a of the landing-gear door takes place about the virtual axis of rotation X, whereby a reciprocal locking and unlocking of the two landing-gear door leaves 110, 110a is ensured via a center closure 114. When the landing-gear door 110, 110a is opened, a passage opening 118 is available and/or used for, e.g. the wheel of an aircraft landing gear to pass through.

Respective first flanges 115, 115a are provided on the outer circumference of the leaves 110, 110a. These flanges 115, 115a interact with second flanges 116, 116a arranged on the circumference of the passage opening 118 on the structure 119. This interaction and the use of a locking device act to lock the landing-gear door. The first flanges 115, 115a also interact with the centrally arranged center closure 114.

As the enlarged detailed representation in FIGS. 26a-26c show, the first and second flanges 115, 115a, 116, 116a have on their sides facing one another respective stop surfaces 156 or 157 that rest against one another in the closed state of the landing-gear door leaves 110, 110a. On their sides facing away from one another, they have first locking surfaces 152 or 153 (see FIG. 26b). A number of clamp elements 161 of a chain arrangement 117 (only one of which is shown in section) have second locking surfaces 164 or 165 that interact in a form-locking manner with the first locking surfaces 152 or 153 provided on the first and second flanges 115, 115a, 116, 116a. The chain arrangement 117 is arranged to run in the radial direction inside the first and second flanges 115, 115a, 116, 116a.

The clamp elements 161 of the chain arrangement 117 are adjustable in their radial position with respect to the center of the leaves 110, 110a of the landing-gear door between a first position lying radially further inside, in which the first locking surfaces 152, 153 of the first and second flanges 115, 115a, 116, 116a and the second locking surfaces 164, 165 of the clamp elements 161 to release the landing-gear door 110, 110a are free of one another (see FIGS. 26b-26c), and a second position lying radially further outside, in which the first locking surfaces 152, 153 of the first and second flanges 115, 115a, 116, 116a and the second locking surfaces 164, 165 of the clamp elements 161 which lock the landing-gear door 110, 110a are fixed against one another (see FIG. 26a).

As can be further seen from FIG. 26, a pressure hose 160, which can be acted on by a hydraulic or pneumatic work medium, is arranged between the clamp elements 161 and a stop surface 160a lying further radially inwards. The clamp elements 161 can be displaced by the hose 160. The pressure hose 160 is acted on with the drive medium through a pressure medium pump 117a (see FIG. 24). When the pressure hose 160 is acted on with the drive medium, a cross-sectional enlargement of the pressure hose 160 causes a radial displacement of the clamp elements 161 to occur from the first position lying radially further inwards (see FIG. 26 b and 26c) to the second position lying radially further outwards (see FIG. 26a). In the second position, the landing-gear door leaves 110, 110a are locked to the aircraft structure 119. When the drive medium flows out of the pressure hose 160, with a cross-sectional reduction of the hose 160 causes a radial displacement of the clamp elements 161 in the opposite direction from the second position lying radially further outwards (see FIG. 26a) to the first position lying radially further inwards so as to release the lock (see FIGS. 26b and 26c). This latter displacement from the locked position to the opened position can be achieved by, e.g., ensuring that the clamp elements 161 are spring-preloaded for a radial displacement from the second position into the first position. In this way, a relief of pressure of the drive medium from the pressure hose 160 causes a displacement of the clamp elements 161 through a spring action. Such movement thus takes place from the second position lying radially further outwards to the first position lying radially further inwards to release the landing-gear door 110, 110a. The clamp elements 161 can thus be displaced by active draining of the drive medium from the pressure hose 160 with cross-sectional reduction of the same to release the landing-gear door 110, 110a from the second position lying radially further outwards into the first position lying radially further inwards.

FIGS. 27a and 27b show as a further exemplary embodiment a passenger door 140 that is supported in the structure 149 of an aircraft 2 by way of at least one parallelogram hinged joint arrangement 141 which uses two legs coupled flexibly to one another with a first axis 93, a second axis 94 and a center axis 95 that each run parallel to one another. A second flange 146 is provided on the structure 149 of the aircraft 2. The flange 146 interacts with a first flange 145 provided on the passenger door 140. When the passenger door 140 is opened, one can gain access to a passage opening 148. A chain arrangement 147 is utilized and, as with the previous embodiments, follows a circumference of the passage opening 148. The arrangement 147 is provided on the second flange 146, which chain arrangement interacting with the first flange 145 and the second flange 146 causes a locking and unlocking of the passenger door 140.

As the enlarged detailed representation in FIGS. 28a and 28b show, the first and second flanges 145, 146 have stop surfaces 156, 157 respectively on the sides facing one another which rest against one another when the passenger door 140 is closed. On sides facing away from one another, first locking surfaces 152 and 153 are utilized (see FIG. 28b).

A number of clamp elements 161 of the flexible chain arrangement 147 (only one of which is shown in section) are used and they have second locking surfaces 164 and 165 that interact in a form-locking manner with the first locking surfaces 152 and 153 provided on the first and second flanges 145 and 146. The clamp elements 161 of the chain arrangement 147, which are arranged to surround the passage opening 148 on the structure 149 of the aircraft 2, are adjustable in their radial position between a first position lying radially further outwards, in which the first locking surfaces 152, 153 of the first and second flanges 145, 146, and the second locking surfaces 164, 165 of the clamp elements 161 are free of one another to release the passenger door 140 (see FIG. 28b), and a second position lying radially further inwards, in which the first locking surfaces 152, 153 of the first and second flanges 145, 146 and the second locking surfaces 164, 165 of the clamp elements 161 are fixed against one another to lock the passenger door 140 (see FIG. 28*a*). The chain arrangement 147 is arranged to run radially outside around the circumference of the first and second flanges 145, 146.

As in the previous exemplary embodiment of FIG. 26, a pressure hose 160 that can be acted on by a hydraulic or pneumatic drive medium is provided between the clamp elements 161 and a contact surface 160*a* lying further outside radially displaced thereto. A pressure medium pump 147*a* is used to act on the pressure hose 160 with the drive medium (see FIG. 27*a*). When the pressure hose 160 is acted on with the drive medium, resulting in a cross-sectional enlargement of the same, a radial displacement of the clamp elements 161 from the first position lying radially further outwards (see FIG. 28*b*) to the second position lying radially further inwards (see FIG. 28*a*) occurs and locks the passenger door 140. When the drive medium flows out of the pressure hose 160, resulting in a cross-sectional reduction, a radial displacement of the clamp elements 161 in the opposite direction takes place from the second position lying radially further inwards to the first position lying radially further outwards to release the passenger door 140.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMBERS

1 Combat aircraft
2 Passenger aircraft
10 Radome
11 Hinge
12 Hinge
14 Radome
15 First flange
16 Second flange
17 Chain or belt arrangement
18 Passage opening
19 Structure
20 Inspection hatch
21 Hinge
22 Hinge
22 Gas pressure spring
25 First flange
26 Second flange
27 Chain or belt arrangement
28 Passage opening
29 Structure
30 Inspection hatch
31, 31*a* Hinge
32, 32*a* Hinge
35, 35*a* First flange
36, 36*a* Second flange
37 Chain or belt arrangement
38 Passage opening
39 Structure
40 Passenger door
41 Hinge
45 First flange
46 Second flange
47 Chain or belt arrangement
48 Passage opening
49 Structure
52 First locking surface
53 First locking surface
54 Second locking surface
55 Second locking surface
56 Stop surface
57 Stop surface
60 Chain or belt element
61 Clamp element
62 End
63 End
64 Second locking surface
65 Second locking surface
66 Sliding block surface
79 Tightening mechanism
71 Threaded pin
72 Thread block
73 Thread block
74 Gear wheel
75 Drive element, hand twist grip
80*a* Body
80*a* Ball
82 Groove
83 Groove
84 Push button
85 Recess
86 Spring
87 Inner casing
88 Outer casing
89 Spring
90 Pyramid gear
90*a*, 90*b* Hinged joint
91 First leg
92 Second leg
93 First fixed axis
94 Second fixed axis
95 Swivel axis
110, Landing-gear door
110*a*
111, Hinge
111*a*
112, Hinge
112*a*
113, Hinge
113*a*
114 Center closure
115, First flange
115*a*
116, Second flange
116*a*
117 Chain arrangement
117*a* Pressure medium pump
118 Passage opening
119 Structure
140 Passenger door
141 Hinge
145 First flange
146 Second flange
147 Chain arrangement
147*a* Pressure medium pump 148 Passage opening
149 Structure
152, 153 First locking surface
156 Stop surface
157 Stop surface
160 Pressure hose
160a Stop surface
161 Clamp element
164, 165 Second locking surface

What is claimed:

1. A system for opening and closing a structural part arranged on a support structure, the system comprising:
 at least one hinged joint device for flexibly connecting the structural part to the support structure;
 the at least one hinged joint device being arranged inside the support structure and having an axis of rotation about which the structural part can be pivoted relative to the support structure during opening and closing; and
 a locking arrangement structured and arranged to connect the structural part to the support structure in a form-locking manner when the structural part is in a closed position,
 in the closed position, the locking arrangement being arranged inside the support structure and is arranged to relieve the at least one hinged joint device;
 the locking arrangement comprising a chain or belt arrangement structured and arranged to lock a first flange of the structural part to a second flange of the support structure; and
 a tightening mechanism for radially expanding and contracting the chain or belt arrangement,
 wherein the tightening mechanism comprises an inflatable hose arranged between clamp elements and a contact surface which is spaced from the clamping elements.

2. The system of claim 1, wherein the inflatable hose is adapted to inflate via one of a hydraulic medium and a pneumatic medium.

3. The system of claim 2, further comprising a pressure pump coupled to the inflatable hose, wherein the pressure pump is structured and arranged to inflate the pressure hose.

4. The system of claim 3, wherein inflation of the pressure hose causes a radial expansion of the chain or belt arrangement.

5. The system of claim 3, wherein inflation of the pressure hose causes a radial contraction of the chain or belt arrangement.

6. A system for opening and closing a structural part arranged on a support structure, the system comprising:
 at least one hinged joint device for flexibly connecting the structural part to the support structure;
 the at least one hinged joint device being arranged inside the support structure and having an axis of rotation about which the structural part can be pivoted relative to the support structure during opening and closing; and
 a locking arrangement structured and arranged to connect the structural part to the support structure in a form-locking manner when the structural part is in a closed position,
 in the closed position, the locking arrangement being arranged inside the support structure and is arranged to relieve the at least one hinged joint device; and
 the locking arrangement comprising a chain or belt arrangement structured and arranged to lock a first flange of the structural part to a second flange of the support structure,
 wherein the locking arrangement further comprises an inflatable hose, wherein clamp elements of the chain or belt arrangement are radially displaceable by removing a fluid from within the inflatable hose.

7. A system for opening and closing a structural part arranged on a support structure, the system comprising:
 at least one hinged joint device for flexibly connecting the structural part to the support structure;
 the at least one hinged joint device being arranged inside the support structure and having an axis of rotation about which the structural part can be pivoted relative to the support structure during opening and closing; and
 a locking arrangement structured and arranged to connect the structural part to the support structure in a form-locking manner when the structural part is in a closed position,
 in the closed position, the locking arrangement being arranged inside the support structure and is arranged to relieve the at least one hinged joint device; and
 the locking arrangement comprising a chain or belt arrangement structured and arranged to lock a first flange of the structural part to a second flange of the support structure,
 wherein the locking arrangement further comprises an inflatable hose, wherein clamp elements of the chain or belt arrangement are radially displaceable by feeding a fluid into the inflatable hose.

* * * * *